United States Patent
Kwon et al.

(10) Patent No.: US 11,353,770 B2
(45) Date of Patent: Jun. 7, 2022

(54) OPTICAL DEVICE AND AUGMENTED REALITY PROVIDING DEVICE

(71) Applicant: Samsung Display Co., Ltd., Yongin-si (KR)

(72) Inventors: Jaejoong Kwon, Suwon-si (KR); Jinoh Kwag, Suwon-si (KR); Juhwa Ha, Seoul (KR); JeongWoo Park, Yongin-si (KR); Subin Jung, Incheon (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/307,355

(22) Filed: May 4, 2021

(65) Prior Publication Data
US 2021/0255522 A1    Aug. 19, 2021

Related U.S. Application Data

(63) Continuation of application No. 16/711,166, filed on Dec. 11, 2019, now Pat. No. 11,016,362.

(30) Foreign Application Priority Data

Dec. 12, 2018  (KR) .......................... 10-2018-0160255

(51) Int. Cl.
*G02F 1/31*    (2006.01)

(52) U.S. Cl.
CPC .................................... *G02F 1/31* (2013.01)

(58) Field of Classification Search
CPC ... G02F 1/31; G02B 27/0172; G02B 27/0093; G02B 27/225; G06F 3/012
USPC ................................................... 349/13
See application file for complete search history.

(56) References Cited

U.S. PATENT DOCUMENTS

| 9,761,051 | B2 | 9/2017 | Bromer |
| 11,016,362 | B2 * | 5/2021 | Kwon ........................ G02F 1/31 |
| 2010/0149073 | A1 | 6/2010 | Chaum et al. |
| 2019/0086668 | A1 | 3/2019 | Ha |
| 2020/0049996 | A1 * | 2/2020 | Yan ...................... G02F 1/13306 |
| 2020/0119310 | A1 | 4/2020 | Huh et al. |

FOREIGN PATENT DOCUMENTS

| KR | 10-1660519 B1 | 9/2016 |
| KR | 10-1830364 B1 | 2/2018 |
| KR | 10-2020-0010695 A | 1/2020 |

* cited by examiner

*Primary Examiner* — Charles S Chang
(74) *Attorney, Agent, or Firm* — Lewis Roca Rothgerber Christie LLP

(57) ABSTRACT

An optical device includes a lens including a reflective mirror, a display module on at least one side surface of the lens and configured to display an image, and a dynamic prism module between the display module and the lens and configured to receive the image. The dynamic prism module is configured to be dynamically turned on or off to provide the received image to different positions of the reflective mirror.

19 Claims, 18 Drawing Sheets

OPTICAL DEVICE AND AUGMENTED REALITY PROVIDING DEVICE

CROSS-REFERENCE TO RELATED APPLICATIONS

This application is a continuation of U.S. patent application Ser. No. 16/711,166, filed on Dec. 11, 2019, which claims priority to and the benefit of Korean Patent Application No. 10-2018-0160255, filed on Dec. 12, 2018, the entire contents of each of which is hereby incorporated by reference.

BACKGROUND

1. Field

Embodiments of the present disclosure relate to an optical device and augmented reality providing apparatus.

2. Description of the Related Art

The term "augmented reality" refers to a technology of superimposing a virtual image on a user's view of the real world image and displaying the superimposed image as a single image. The virtual image may be an image in the form of text or graphics, and the real image is information on real objects observed in the field of view of the device.

The augmented reality may be implemented by a head mounted display (HMD) or a head-up display (HUD). When the augmented reality is implemented by the HMD, the HMD is provided in the form of a pair of glasses so that a user easily wears it or carries it.

An augmented reality providing device may include a display device to provide the virtual image used to implement the augmented reality. In recent years, there has been a demand to enlarge an area of the display device, which is seen by the user, that is, a field of view (FOV) of the user.

SUMMARY

Embodiments of the present disclosure provide an optical device and an augmented reality providing device having an enlarged field of view of a user without increasing its thickness.

Embodiments of the present disclosure provide an optical device including a lens including a reflective member, a display module on at least one side surface of the lens and configured to display an image, and a dynamic prism module between the display module and the lens and configured to receive the image, the dynamic prism module being configured to be dynamically turned on or off to provide the received image to different positions of the reflective member.

The dynamic prism module includes a first electrode, a second electrode facing the first electrode, a resin layer between the first electrode and the second electrode and having a reference refractive index, and a refractive index control layer between the first electrode and the second electrode, the refractive index control layer being configured to be turned on or off by an electric field formed between the first electrode and the second electrode to vary a refractive index thereof.

The resin layer includes an inclination surface inclined at a first angle with respect to the first electrode.

The refractive index control layer includes a refractive index anisotropy material.

The refractive index anisotropy material is a liquid crystal material.

The refractive index control layer has a first refractive index that is equal to the reference refractive index in a turned-off state and has a second refractive index that is different from the reference refractive index in a turned-on state.

When the dynamic prism module is in the turned-off state, the image is provided to a first position of the reflective member without being refracted by the refractive index control layer, and when the dynamic prism module is in the turned-on state, the image is provided to a second position of the reflective member after being refracted at a second angle by the refractive index control layer.

The second angle is determined by a difference between the reference refractive index and the second refractive index and the first angle.

The dynamic prism module includes a plurality of dynamic prism areas.

The resin layer includes a plurality of sub-resin layers respectively corresponding to the dynamic prism areas, and the refractive index control layer includes a plurality of sub-refractive index control layers respectively corresponding to the plurality of sub-resin layers.

The first electrode includes a plurality of sub-electrodes located to respectively correspond to the sub-resin layers.

The sub-resin layers make contact with the sub-refractive index control layers to provide a plurality of interfaces to the dynamic prism areas, respectively.

Angles between the first electrode and the interfaces are the same for each of the dynamic prism areas.

Angles between the first electrode and the interfaces are different from each other for each of the dynamic prism areas.

The dynamic prism module is configured to be turned on or off in synchronization with the display module.

The display module is configured to display a first image during a first period of one frame and is configured to display a second image during a second period of the one frame.

The dynamic prism module is configured to be turned off during the first period to provide the first image to the first position of the reflective member and configured to be turned on during the second period to provide the second image to the second position of the reflective member.

The dynamic prism module includes a first electrode, a second electrode facing the first electrode, a variable polarizer layer between the first electrode and the second electrode and having a polarizing state that is dynamically varied by an electric field formed between the first electrode and the second electrode, a resin layer between the second electrode and the lens and having a reference refractive index, and a refractive index control layer between the second electrode and the lens.

The resin layer includes an inclination surface inclined at a first angle with respect to the first electrode.

The optical device further includes a light collecting member configured to receive the image from the display module and is configured to collect the image.

The light collecting member is between the display module and the dynamic prism module.

The display module includes an organic light emitting display device.

The display module includes a flexible display module.

The flexible display module is on two or more side surfaces of the lens.

The flexible display module includes two or more display units, and the two or more display units respectively correspond to two or more side surfaces of the lens.

Embodiments of the present disclosure provide an optical device including a lens including a reflective member, a flexible display module on at least one side surface of the lens, configured to display a first image during a first period, and configured to display a second image during a second period, and a dynamic prism module between the flexible display module and the lens, the dynamic prism module being configured to be turned off during the first period in synchronization with the flexible display module to provide the first image to a first position of the reflective member, and configured to be turned on during the second period to refract the second image and provide the second image to a second position of the reflective member.

Embodiments of the present disclosure provide an augmented reality providing device including a lens including a reflective member, a light emitting module on at least one side surface of the lens and configured to emit an image light, and a dynamic prism module between the display module and the lens and configured to receive the image, the dynamic prism module being configured to be dynamically turned on or off to provide the received image to different positions of the reflective member.

According to the above, the optical device providing device may enlarge the area of the display module perceived by the user's eye, e.g., the field of view (FOV) of the user, without increasing the thickness of the lens and the display module.

BRIEF DESCRIPTION OF THE DRAWINGS

The above and other features of the subject matter of the present disclosure will become readily apparent by reference to the following detailed description when considered in conjunction with the accompanying drawings wherein.

DETAILED DESCRIPTION

Figure 1:
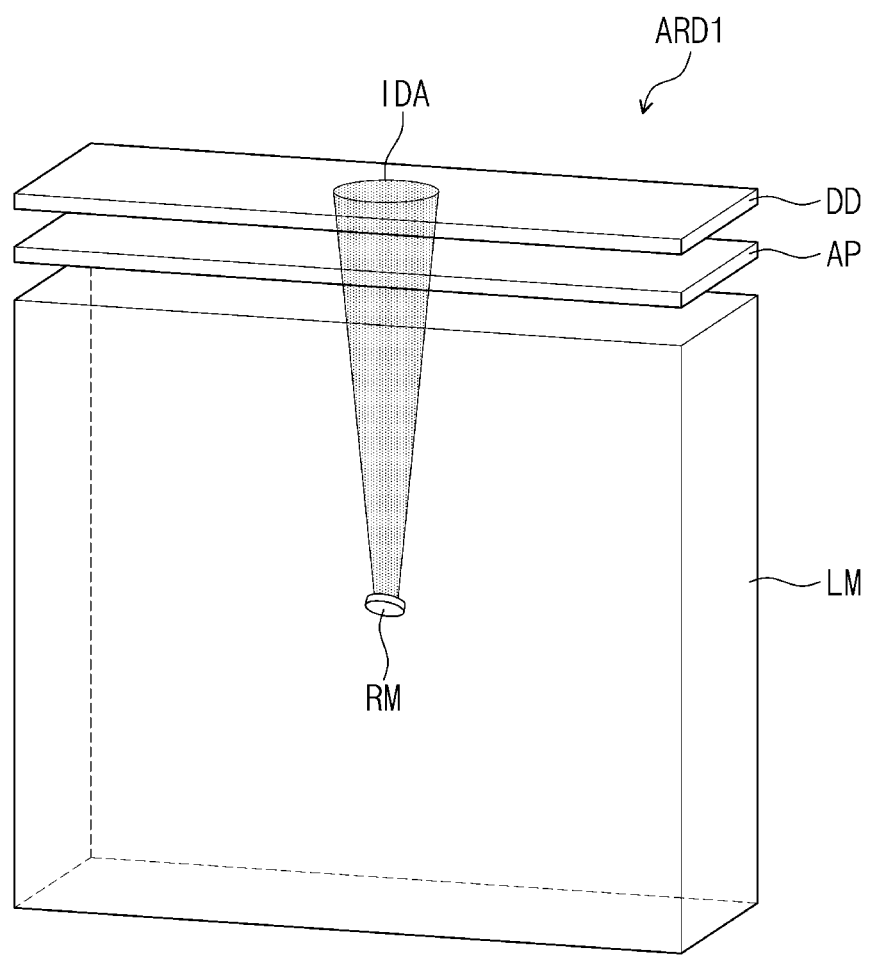
FIG. 1 is a perspective view showing an augmented reality providing device according to an exemplary embodiment of the present disclosure.

It will be understood that when an element or layer is referred to as being "on", "connected to" or "coupled to" another element or layer, it can be directly on, connected to, or coupled to the other element or layer or intervening elements or layers may be present.

Like numerals refer to like elements throughout. In the drawings, the thickness, ratio, and dimension of components may be exaggerated for clarity of description.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, the present disclosure will be explained in more detail with reference to the accompanying drawings.

Figure 2:
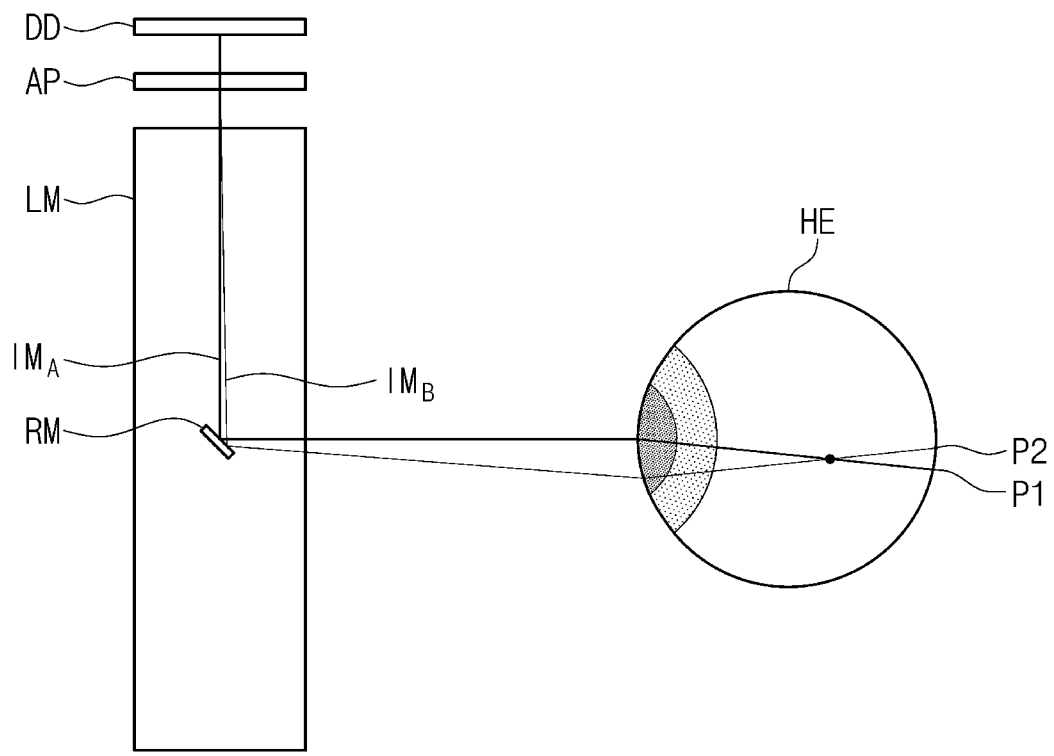
FIG. 2 is a cross-sectional view showing an operation of the augmented reality providing device shown in FIG. 1.

FIG. 1 is a perspective view showing an augmented reality providing device ARD1 according to an exemplary embodiment of the present disclosure, and FIG. 2 is a cross-sectional view showing an operation of the augmented reality providing device ARD1 shown in FIG. 1.

Referring to FIGS. 1 and 2, the augmented reality providing device ARD1 according to the exemplary embodiment of the present disclosure includes a lens LM, a display module DD, and a dynamic prism module AP.

The lens LM may be formed of a glass or plastic material to be transparent or semi-transparent. Accordingly, a user may see a real image through the lens LM. The lens LM may have a set or predetermined refractive index by taking into account a user's sight.

The lens LM may have a hexahedron shape defined by two bottom faces and four side faces, each of which has a quadrangular shape, however, the shape of the lens LM should not be limited thereto or thereby. In some embodiments, the lens LM may have various other suitable shapes. For example, the lens LM may have a polyhedron shape defined by two bottom faces and side faces coupling the two bottom faces, each of which has a polygonal shape. In addition, the lens LM may have other shapes, such as a cylindrical shape, an elliptical-cylindrical shape, a semi-cylindrical shape, or a semi-elliptical cylindrical shape.

The lens LM includes a reflective mirror RM. The reflective mirror RM may be called a pin mirror. The reflective mirror RM may include a metal material having a high reflectance, such as silver (Ag).

FIG. 1 shows the lens LM including one reflective mirror RM, but the number of the reflective mirrors RM should not be limited to one. For example, the lens LM may include a plurality of reflective mirrors RM.

The display module DD displays a virtual image to implement an augmented reality. The display module DD may be on at least one side surface among the side surfaces of the lens LM. In FIGS. 1 and 2, the display module DD is on one side surface of the lens LM, but it should not be limited thereto or thereby. For example, the display module DD may be on two or more side surfaces of the lens LM.

The display module DD may include a display area IDA that displays an image. FIG. 1 shows only one display area IDA, however, the display module DD may include a plurality of display areas.

The reflective mirror RM reflects the virtual image displayed through the display module DD so that the virtual image is formed at one point on a retina of a user's eye HE. Therefore, although the user focuses on the real image through the lens LM, the user may see the virtual image clearly as shown in FIG. 2. For example, the user may see the virtual image clearly even though the user does not move the focus on the real image to the virtual image.

The reflective mirror RM may have a size smaller than a size of a pupil of the user's eye. For example, a diameter of the reflective mirror RM may be about 4 mm or less. In this case, because the user focuses on the real image, it is difficult for the user to recognize the reflective mirror RM. However, as the size of the reflective mirror RM decreases, a brightness of the virtual image provided to the user's eye HE by the display module DD may decrease. Thus, the size of the reflective mirror RM may be set by taking into account the brightness of the virtual image.

In a case where the size of the reflective mirror RM is smaller than the size of the pupil, the reflective mirror RM has a pin-hole effect. Accordingly, when the virtual image displayed through the display module DD is reflected by the reflective mirror RM, a depth of field becomes deep.

In FIG. 1, the reflective mirror RM has a circular plate shape, however, the reflective mirror RM may include an oval or polygonal plate shape rather than the circular plate shape. In some embodiments, the reflective mirror RM may have a curved shape.

Referring to FIGS. 1 and 2, the dynamic prism module AP may be between the display module DD and the lens LM. The dynamic prism module AP receives the image from the display module DD. The dynamic prism module AP may be dynamically turned on or off. Accordingly, the dynamic prism module AP may provide the received image to different positions of the reflective mirror RM depending on a turned-on or off operation thereof.

In more detail, when the dynamic prism module AP is in a turned-off state, the image provided to the dynamic prism module AP is input to the reflective mirror RM without being refracted. When the dynamic prism module AP is in the turned-on state, the image provided to the dynamic prism module AP is input to the reflective mirror RM after being refracted. Therefore, the image may be provided to the different positions of the reflective mirror RM depending on the on/off operation of the dynamic prism module AP.

The display module DD may periodically provide different images. In more detail, the display module DD may provide a first image $IM_A$ to the dynamic prism module AP during a turned-off period (OFF) of the dynamic prism module AP and may provide a second image $IM_B$ to the dynamic prism module AP during a turned-on period (ON) of the dynamic prism module AP.

Accordingly, a direction in which the first image $IM_A$ is incident into the user's eye HE and a direction in which the second image $IM_B$ is incident into the user's eye HE are different from each other due to the on/off operation of the dynamic prism module AP. The first image $IM_A$ may be projected onto a first position P1 of the retina of the user's eye HE, and the second image $IM_B$ may be projected onto a second position P2 of the retina of the user's eye HE. Thus, the user may perceive one image obtained by merging the first image $IM_A$ and the second image $IM_B$, which are incident to the user's eye with a time difference, as the virtual image.

Figure 3:
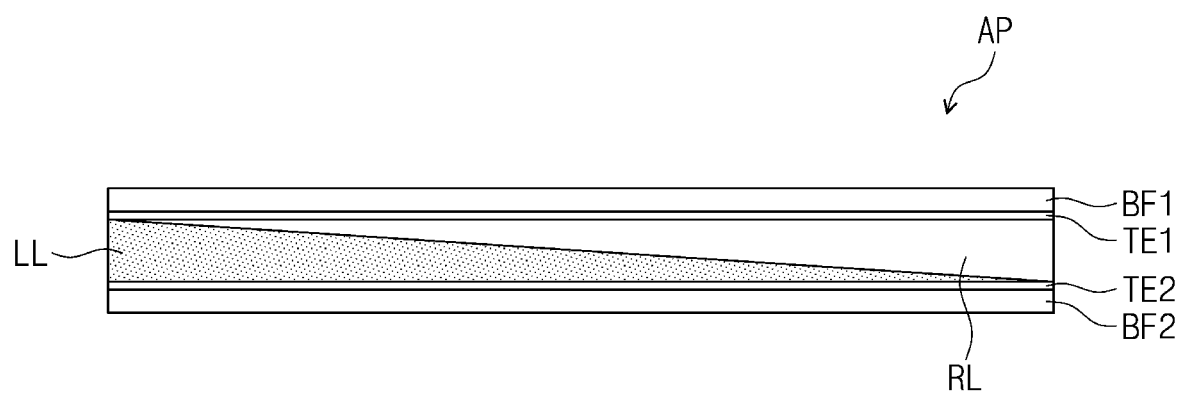
FIG. 3 is a cross-sectional view showing a dynamic prism module according to an exemplary embodiment of the present disclosure.
Figure 4A:
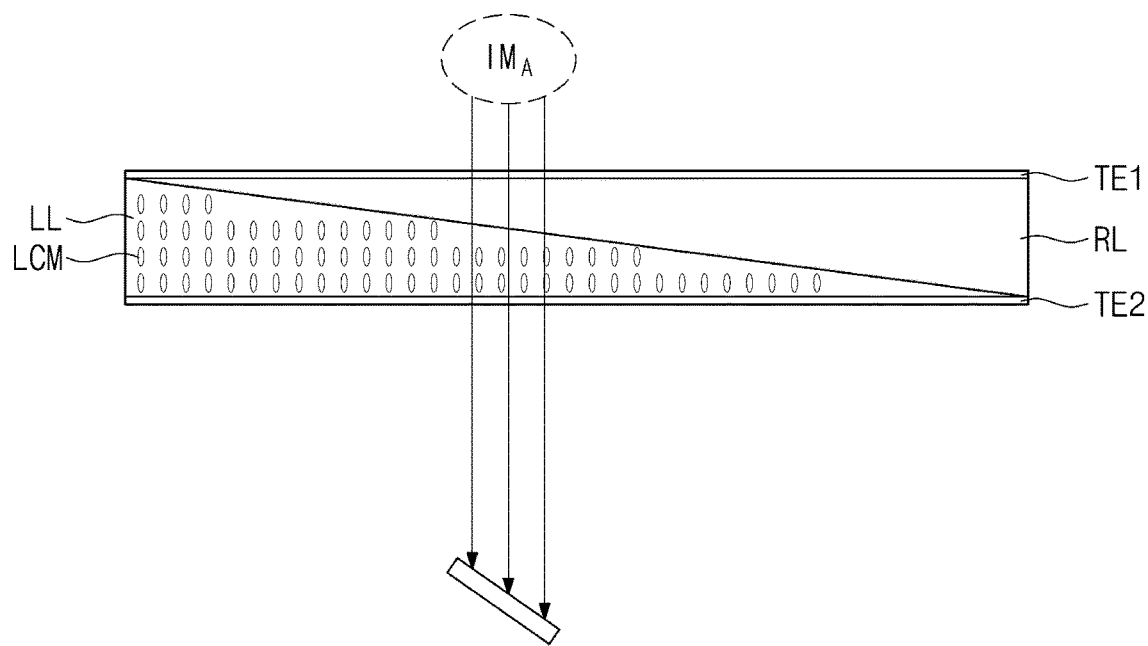
FIG. 4A is a cross-sectional view showing a turned-off state of the dynamic prism module shown in FIG. 3.

FIG. 3 is a cross-sectional view showing a dynamic prism module AP according to an exemplary embodiment of the present disclosure. FIG. 4A is a view showing the turned-off state of the dynamic prism module shown in FIG. 3, and FIG. 4B is a view showing the turned-on state of the dynamic prism module shown in FIG. 3.

Figure 4B:
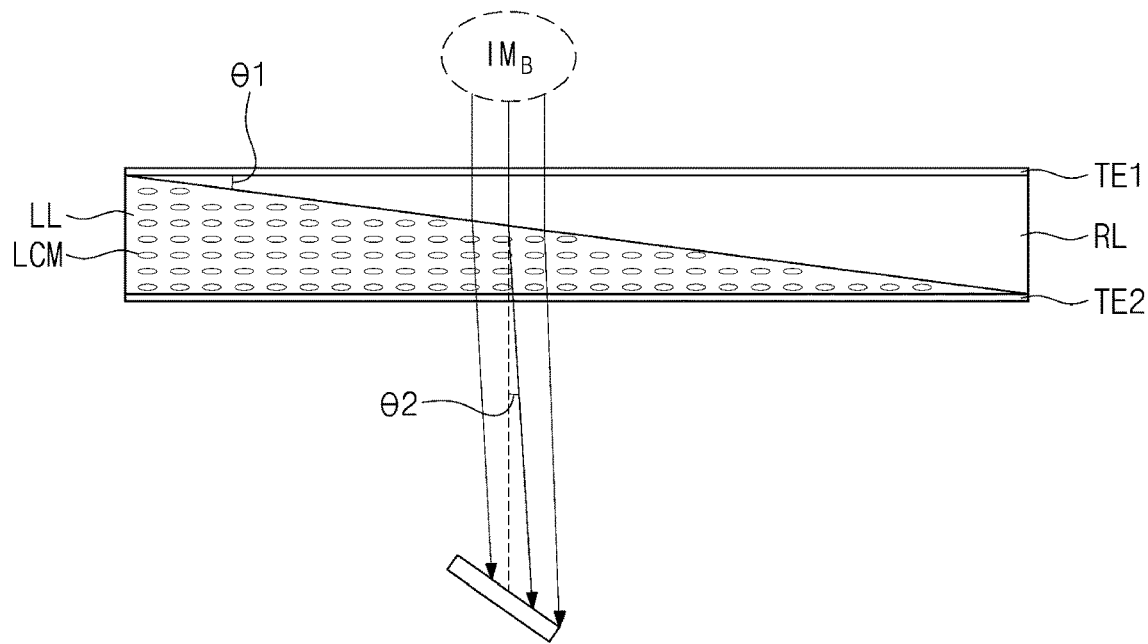
FIG. 4B is a cross-sectional view showing a turned-on state of the dynamic prism module shown in FIG. 3.

Referring to FIGS. 3 to 4B, the dynamic prism module AP according to the exemplary embodiment of the present disclosure may include a first electrode TE1, a second electrode TE2, a resin layer RL, and a refractive index control layer LL.

The first electrode TE1 and the second electrode TE2 are located to face each other, and the resin layer RL and the refractive index control layer LL are between the first electrode TE1 and the second electrode TE2.

The dynamic prism module AP further includes first base film BF1 and second base film BF2. The first electrode TE1 is on one surface of the first base film BF1, and the second electrode TE2 is on one surface of the second base film BF2. The first base film BF1 and the second base film BF2 are to face each other.

Each of the first base film BF1 and the second base film BF2 may be a film of a transparent polymer resin. A material for the first base film BF1 and the second base film BF2 should not be particularly limited. The first base film BF1 and the second base film BF2 may be a substrate of a glass or plastic material, which is thin.

Each of the first electrode TE1 and the second electrode TE2 may include a transparent conductive material. Each of the first electrode TE1 and the second electrode TE2 may include indium tin oxide or indium zinc oxide. As another example, each of the first electrode TE1 and the second electrode TE2 may include a metal material having a high transmittance. Voltages may be applied to the first electrode TE1 and the second electrode TE2, respectively.

When the same voltage is applied to the first electrode TE1 and the second electrode TE2, no electric field is formed between the first electrode TE1 and the second electrode TE2, and the dynamic prism module AP is in the turned-off state. On the contrary, when different voltages are respectively applied to the first electrode TE1 and the second electrode TE2, the electric field is formed between the first electrode TE1 and the second electrode TE2. The state in which the electric field is formed may be defined as the turned-on state of the dynamic prism module AP.

As an example, one electrode selected from the first electrode TE1 and the second electrode TE2 may receive the same reference voltage in the turned-on and turned-off states. The other electrode selected from the first electrode TE1 and the second electrode TE2 may receive a driving voltage having the same level as that of the reference voltage in the turned-off state and may receive a driving voltage having a level different from that of the reference voltage in the turned-on state.

The resin layer RL may be on the first electrode TE1. The resin layer RL may include an acrylic-based polymer material. As an example of the present disclosure, the resin layer RL may include polymethylmethacrylate (PMMA) or polycarbonate (PC). The resin layer RL may have a reference refractive index. For example, the reference refractive index is about 1.49. The resin layer RL includes a surface (hereinafter, referred to as a "first inclination surface") inclined with respect to an upper surface of the first electrode TE1. The first inclination surface is inclined at a first angle θ1 with respect to the first electrode TE1.

The refractive index control layer LL is on the resin layer RL. The refractive index control layer LL includes a material having a refractive index anisotropy. As an example of the present disclosure, the refractive index control layer LL may be a liquid crystal layer including liquid crystal molecules LCM.

The refractive index control layer LL is between the resin layer RL and the second electrode TE2. The first base film BF1 on which the first electrode TE1 and the resin layer RL are formed and the second base film BF2 on which the second electrode TE2 is formed are coupled to each other such that the first electrode TE1 and the second electrode TE2 face each other. The refractive index control layer LL is formed by injecting a liquid crystal material into between the first base film BF1 and the second base film BF2.

In some embodiments, the dynamic prism module AP may further include a sealing layer between the first base film BF1 and the second base film BF2. The sealing layer may seal the liquid crystal material filled in between the first base film BF1 and the second base film BF2.

The refractive index control layer LL is located to make contact (e.g., physical contact) with the first inclination surface of the resin layer RL. An interface between the refractive index control layer LL and the resin layer RL is inclined at the first angle θ1 with respect to the first electrode TE1.

The refractive index of the refractive index control layer LL may be varied depending on the electric field formed between the first electrode TE1 and the second electrode TE2.

When the electric field is not formed between the first electrode TE1 and the second electrode TE2 (e.g., the turned-off state), the liquid crystal molecules LCM of the refractive index control layer LL may be aligned in a first state. The refractive index control layer LL may have a first refractive index in the first state. As an example of the present disclosure, the first refractive index may have the same (e.g., substantially the same) value as the reference refractive index.

When the electric field is formed between the first electrode TE1 and the second electrode TE2 (e.g., the turned-on state), the liquid crystal molecules LCM of the refractive index control layer LL may be aligned in a second state. The refractive index control layer LL may have a second refractive index in the second state. As an example of the present disclosure, the second refractive index may have a different value from the reference refractive index. As an example, the first refractive index may be about 1.49, and the second refractive index may be about 1.80. Magnitudes of the reference refractive index and the first refractive index and the second refractive index should not be particularly limited under the condition that the reference refractive index and the first refractive index are equal to each other and the reference refractive index and the second refractive index are different from each other.

As shown in FIG. 4A, when the dynamic prism module AP is in the turned-off state, the refractive index control layer LL has the first refractive index that is equal to the reference refractive index due to the liquid crystal molecules LCM aligned in the first state. Accordingly, the first image $IM_A$ provided from the display module DD is provided to the reflective mirror RM without being refracted even though the first image $IM_A$ passes through the dynamic prism module AP.

As shown in FIG. 4B, when the dynamic prism module AP is in the turned-on state, the liquid crystal molecules LCM are aligned in the second state, and thus, the refractive index of the refractive index control layer LL is varied. For example, the refractive index control layer LL has the second refractive index different from the reference refractive index. Due to a difference between the reference refractive index and the second refractive index, the second image $IM_B$ provided from the display module DD is provided to the reflective mirror RM after being refracted by the dynamic prism module AP.

Accordingly, the position where the first image $IM_A$ is provided to the reflective mirror RM is different from the position where the second image $IM_B$ is provided to the reflective mirror RM. In this case, an angle at which the second image $IM_B$ is refracted by the dynamic prism module AP may be defined as a second angle θ2.

The second angle θ2 may be determined by the difference between the reference refractive index and the second refractive index and the first angle θ1.

The second angle θ2 may be determined by the following Equation.

$$\theta 2 = \sin^{-1}\left(\frac{n0}{n2} \times \sin(\theta 1)\right) - \theta 1$$

In Equation, "n0" denotes the reference refractive index, "n2" denotes the second refractive index, and "θ1" and "θ2" denote the first angle and the second angle, respectively.

In some embodiments, a direction in which the second image $IM_B$ travels may be changed by a difference in refractive index between the lens LM (refer to FIG. 2) and the dynamic prism module AP and a difference in refractive index between an exit surface of the lens LM and an air layer. Therefore, the refractive index of the lens LM may act as a variable to determine the first angle θ1 in addition to the second refractive index of the refractive index control layer LL and the reference refractive index.

Figure 5:
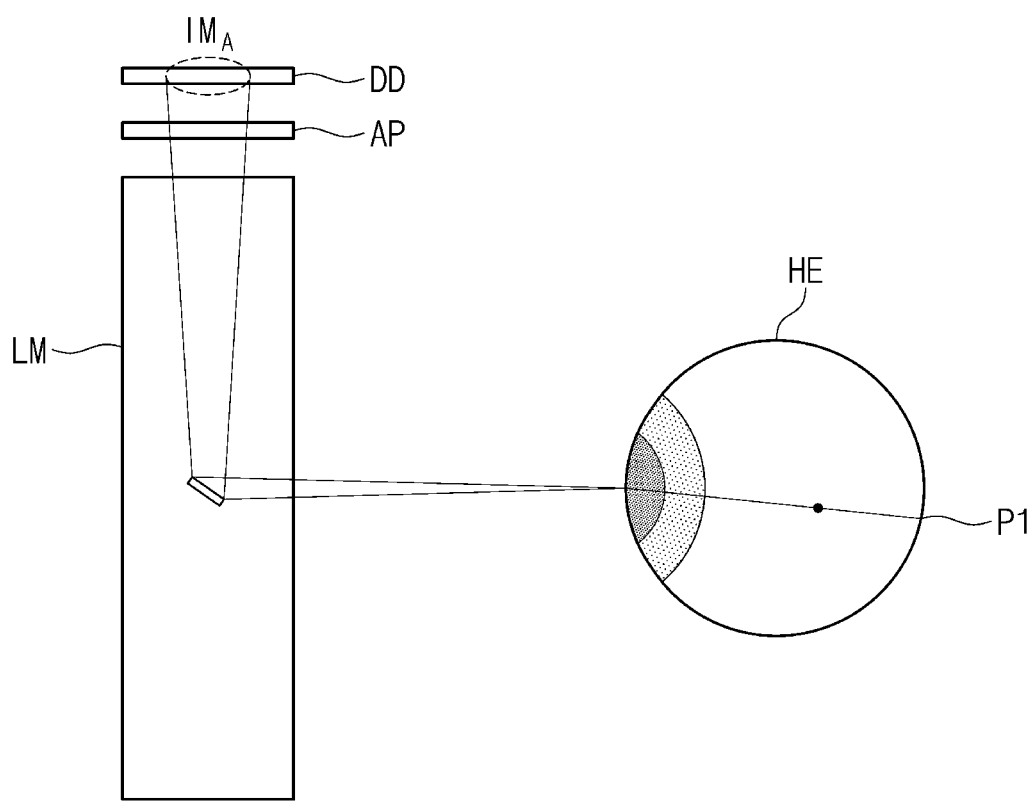
FIG. 5 is a cross-sectional view showing an operation of an augmented reality providing device according to the turned-off state of the dynamic prism module shown in FIG. 4A.
Figure 6:
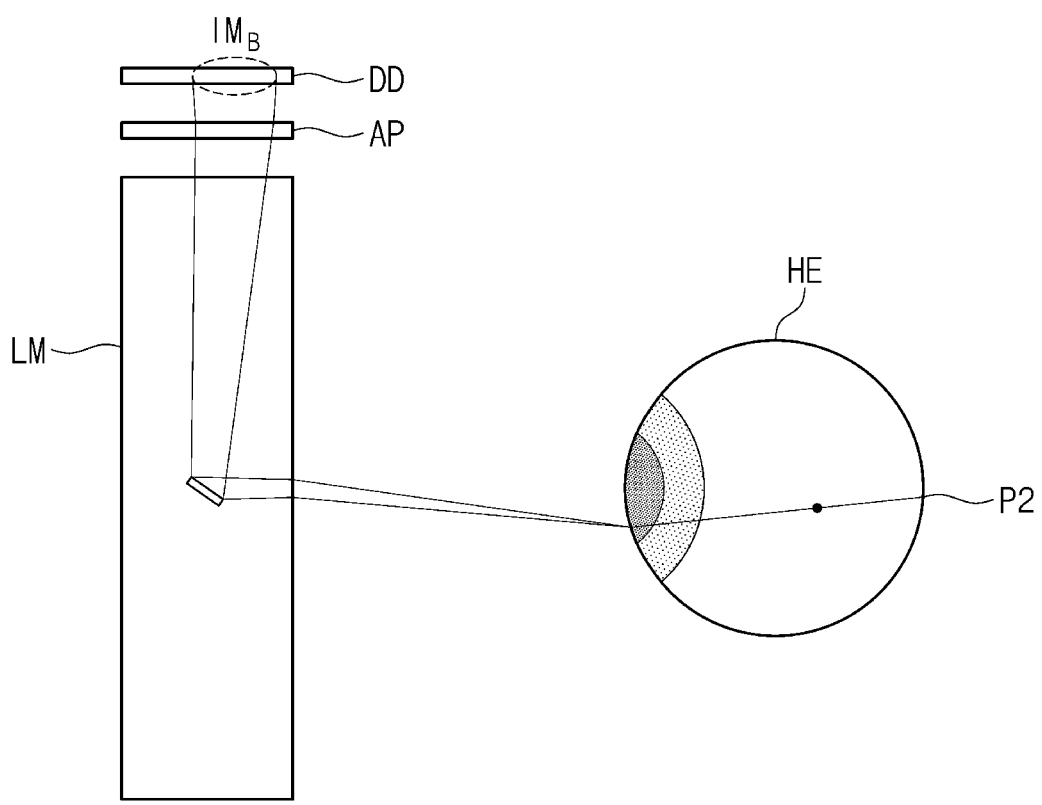
FIG. 6 is a cross-sectional view showing an operation of an augmented reality providing device according to the turned-on state of the dynamic prism module shown in FIG. 4B.
Figure 7A:
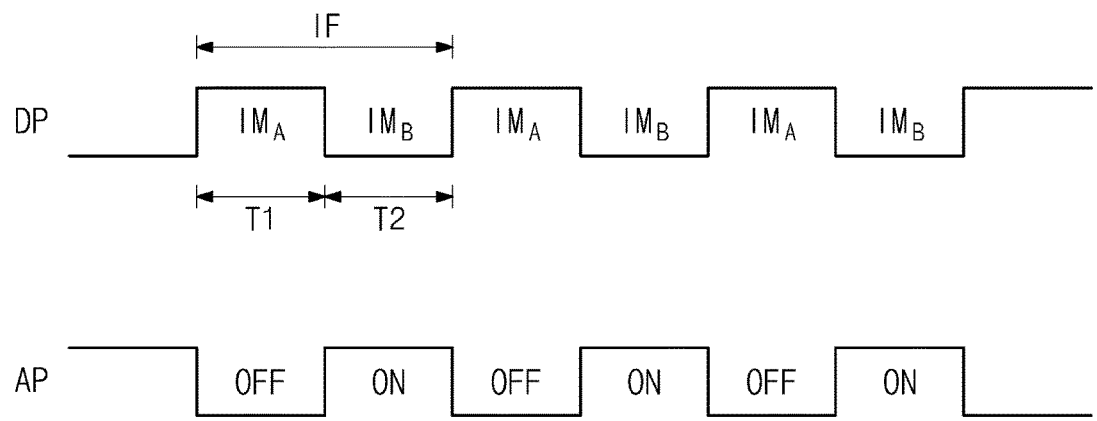
FIG. 7A is a waveform diagram showing an operation of a display module and a dynamic prism module.
Figure 7B:
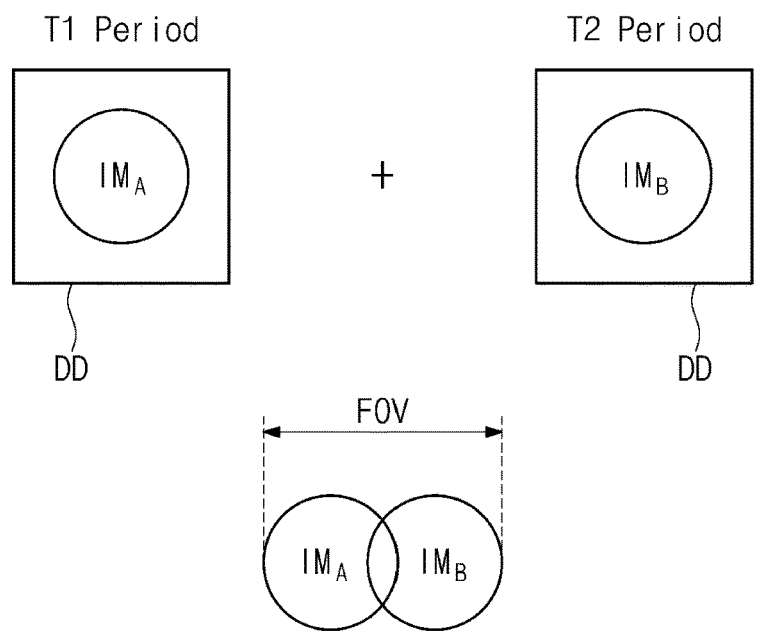
FIG. 7B is a view showing an image perceived by a user according to the operation of a display module and a dynamic prism module.

FIG. 5 is a view showing an operation of the augmented reality providing device according to the turned-off state of the dynamic prism module shown in FIG. 4A, and FIG. 6 is a view showing an operation of the augmented reality providing device according to the turned-on state of the dynamic prism module shown in FIG. 4B. FIG. 7A is a waveform diagram showing an operation of the display module and the dynamic prism module, and FIG. 7B is a view showing an image perceived by the user according to the operation of the display module and the dynamic prism module.

Referring to FIGS. 5, 6, 7A, and 7B, the display module DD may display the first image $IM_A$ and the second image $IM_B$ during one frame 1F in which the image is displayed. In more detail, the first image $IM_A$ is displayed during a first period (T1 Period) of the one frame 1F, and the second image $IM_B$ is displayed during a second period (T2 Period) of the one frame 1F. In the present exemplary embodiment, the first image $IM_A$ may be defined as a first portion of the image that is to be provided to the user, and the second image $IM_B$ may be defined as a second portion of the image that is to be provided to the user.

The first image $IM_A$ and the second image $IM_B$ may include portions overlapping with each other in the image, however, they should not be limited thereto or thereby. For example, the first image $IM_A$ and the second image $IM_B$ may not overlap with each other.

The dynamic prism module AP may operate in synchronization with the display module DD. In more detail, the dynamic prism module AP is turned off during the first period (T1 Period) of the display module DD. The dynamic prism module AP provides the first image $IM_A$ to the reflective mirror RM during the first period (T1 Period) without refracting the first image $IM_A$. Meanwhile, the dynamic prism module AP is turned on during the second period (T2 Period) of the display module DD. The dynamic prism module AP refracts the second image $IM_B$ and provides the refracted second image $IM_B$ to the reflective mirror RM during the second period (T2 Period).

The direction in which the first image $IM_A$ is incident into the user's eye HE and the direction in which the second image $IM_B$ is incident into the user's eye HE become different depending on the on/off operation of the dynamic prism module AP. The first image $IM_A$ is projected onto the first position P1 of the retina of the user's eye HE, and the second image $IM_B$ is projected onto the second position P2 of the retina of the user's eye HE.

Accordingly, as shown in FIG. 7B, the user may perceive one image obtained by merging the first image $IM_A$ and the second image $IM_B$, which are incident to the user's eye HE with a time difference, as the virtual image.

A size of the field of view FOV of the user, in which the user recognizes, may increase as compare with a size of the display area IDA in which the first image $IM_A$ and the second image $IM_B$ are sequentially displayed on the display module DD. Thus, the augmented reality providing device ARD1 may increase the size of the field of view FOV of the user without increasing the width of the display module DD, the width of the lens LM, and the number of the reflective mirrors RM.

In FIGS. 1 to 6, 7A, and 7B, only two states in which the dynamic prism module AP is turned on or off have been shown, however, the present disclosure should not be limited thereto or thereby. For example, the dynamic prism module AP may further include an intermediate state between the turned-off state and the turned-on state. The refractive index control layer LL may have a refractive index between the reference refractive index and the second refractive index in the intermediate state.

As described above, in the case where the dynamic prism module AP has the three states, the display module DD may divide the one frame 1F into three sections. The display module DD may display different images every section.

Figure 8A:
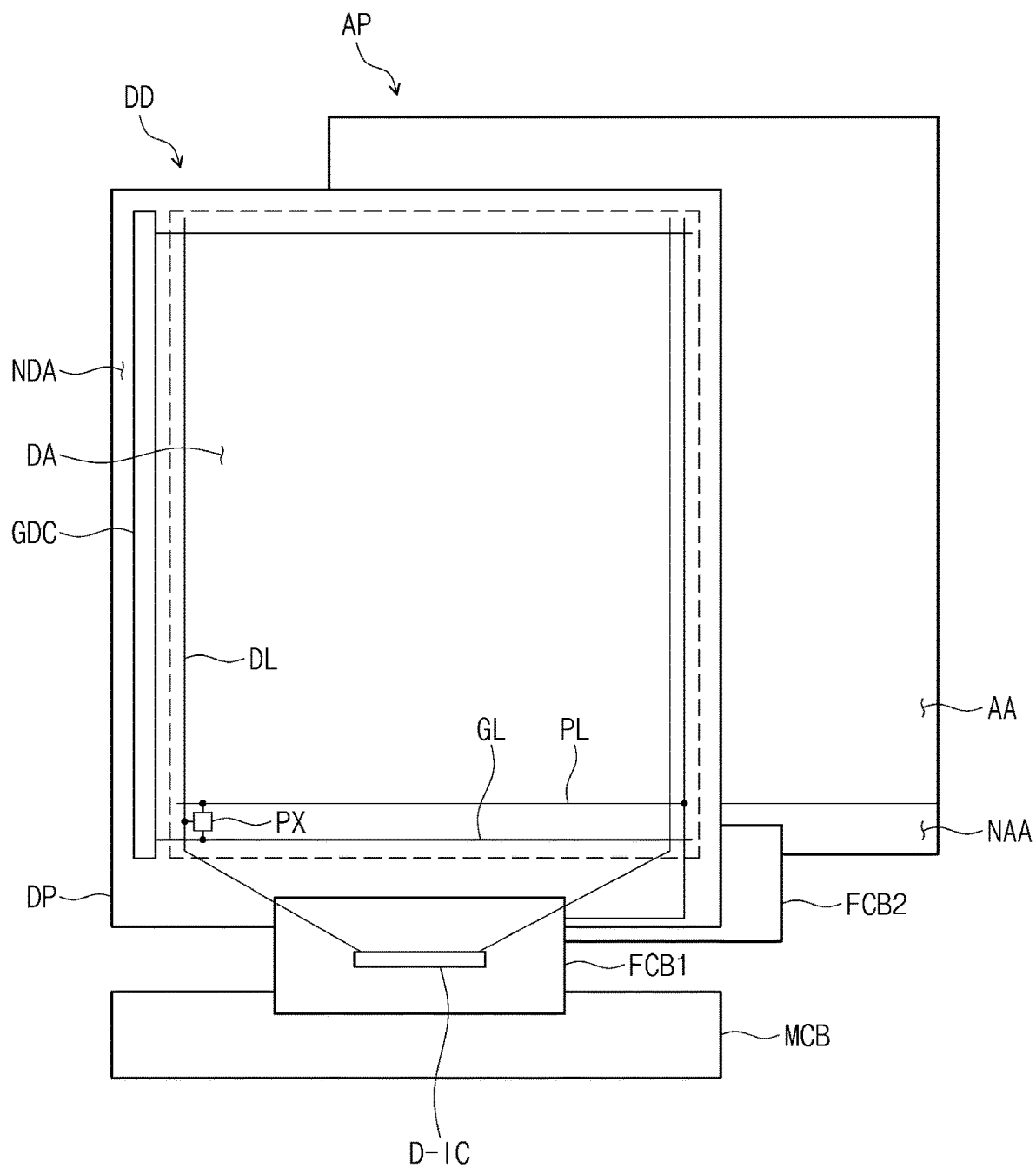
FIG. 8A is a plan view showing a display module and a dynamic prism module shown in FIG. 1.
Figure 8B:
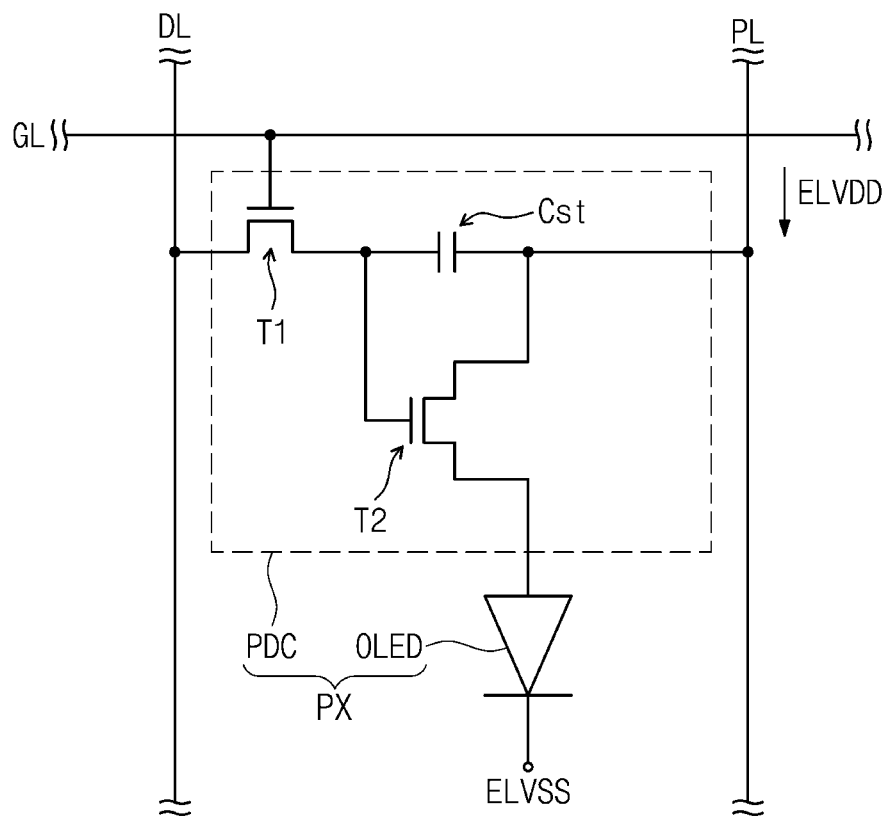
FIG. 8B is a circuit diagram of a pixel shown in FIG. 8A.
Figure 8C:
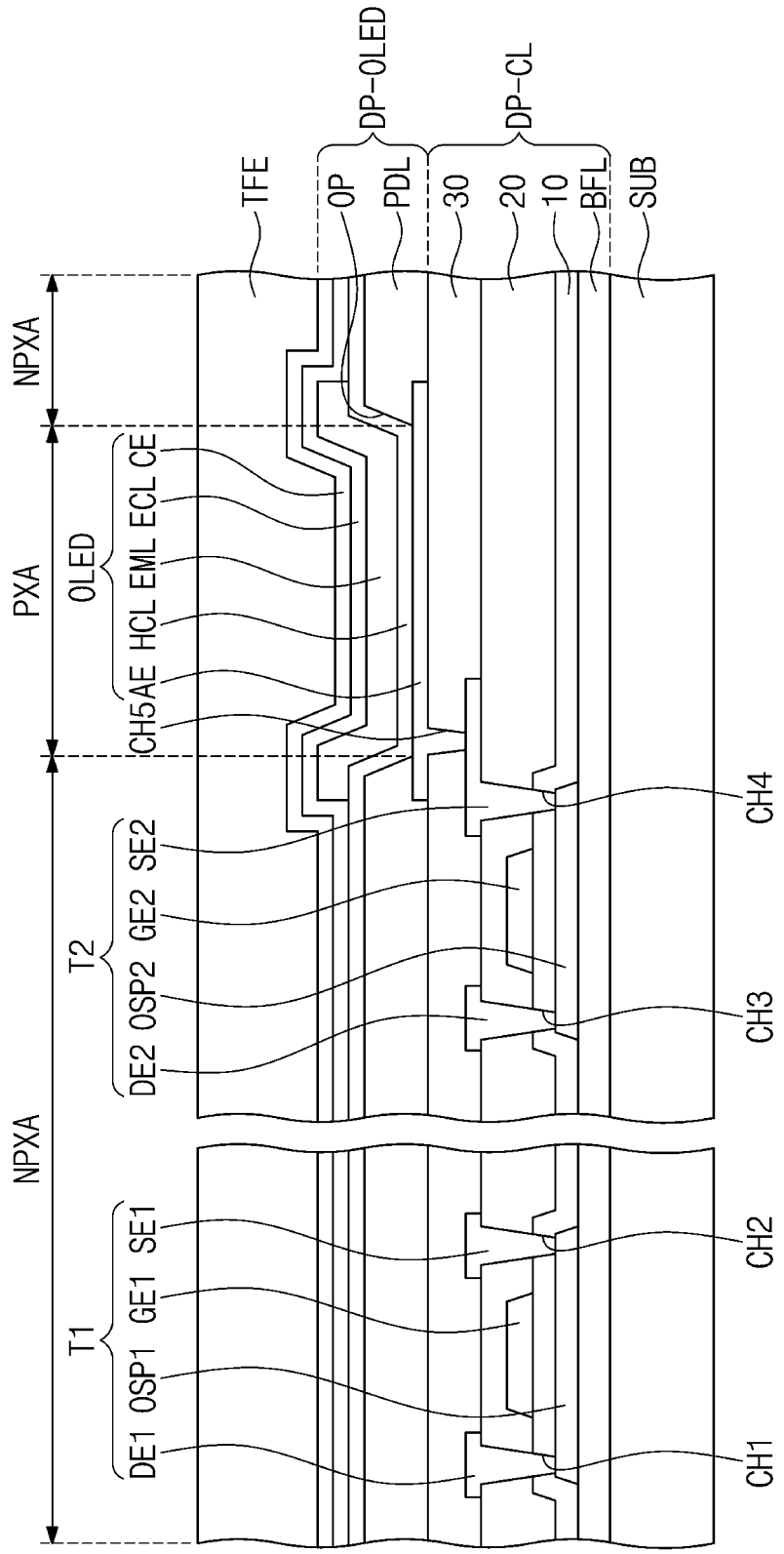
FIG. 8C is a cross-sectional view showing a display panel according to an exemplary embodiment of the present disclosure

FIG. 8A is a plan view showing the display module and the dynamic prism module shown in FIG. 1, FIG. 8B is a circuit diagram of a pixel shown in FIG. 8A, and FIG. 8C is a cross-sectional view showing a display panel according to an exemplary embodiment of the present disclosure.

Referring to FIGS. 8A to 8C, the display module DD includes the display panel DP. The display panel DP includes a display area DA and a non-display area NDA when viewed in a plan view. In the present exemplary embodiment, the non-display area NDA is defined along an edge of the display area DA.

The display panel DP includes a driving circuit GDC, a plurality of signal lines (e.g., scan lines GL, data lines DL, and a power line PL) and a plurality of pixels PX. The pixels PX are arranged in the display area DA. Each of the pixels PX includes an organic light emitting diode OLED and a pixel driving circuit PDC coupled to the organic light emitting diode OLED. The driving circuit GDC, the signal lines (e.g., the scan lines GL, the data lines DL, and the power line PL), and the pixel driving circuit PDC may be included in a circuit element layer DP-CL shown in FIG. 8C.

The driving circuit GDC includes a shift register. The shift register includes a plurality of stages, each of which generates a plurality of scan signals, and sequentially outputs the scan signals to a plurality of scan lines GL described below. As another example, the driving circuit GDC may further output another control signal to the pixel driving circuit PDC.

The driving circuit GDC may include a plurality of transistors formed through the same process as the pixel driving circuit PDC, e.g., an amorphous silicon process, a low temperature polycrystalline silicon (LTPS) process, a low temperature polycrystalline oxide (LTPO) process, or an oxide semiconductor process.

The plurality of signal lines include the scan lines GL, the data lines DL, and the power line PL. Each of the scan lines GL is coupled to a corresponding pixel PX among the pixels PX, and each of the data lines DL is coupled to a corresponding pixel PX among the pixels PX. The power line PL is coupled to the pixels PX.

The display module DD includes a first circuit board FCB1 coupled to the display panel DP and a driving chip D-IC mounted on the first circuit board FCB1. The first circuit board FCB1 is coupled to a main circuit board MCB. In some embodiments, a plurality of passive elements and a plurality of active elements may be mounted on the main circuit board MCB. The first circuit board FCB1 and the main circuit board MCB may be a flexible circuit board.

In the present exemplary embodiment, a chip-on-film (COF) structure in which the driving chip D-IC is mounted on the first circuit board FCB1 is shown, however, it should not be limited thereto or thereby. For example, the display module DD may have a chip-on-panel (COP) structure in which the driving chip D-IC is mounted on the display panel DP.

The dynamic prism module AP may include an active area AA and a non-active area NAA defined therein when viewed in a plan view. In the present exemplary embodiment, the active area AA may be defined as an area corresponding to the display area DA of the display module DD.

The first electrode TE1 and the second electrode TE2 (refer to FIG. 3), the resin layer RL (refer to FIG. 3), and the refractive index control layer LL (refer to FIG. 3) are in the active area AA of the dynamic prism module AP, and thus, the active area AA of the dynamic prism module AP may vary the refractive index of the image incident thereto. Signal lines used to apply signals to the first electrode TE1 and the second electrode TE2 are in the non-active area NAA, and the non-active area NAA is located around the active area AA in which the variation of the refractive index substantially occurs.

The dynamic prism module AP may further include a second circuit board FCB2 attached to one of the first base film BF1 and the second base film BF2 (refer to FIG. 3). In some embodiments, the second circuit board FCB2 may be electrically and physically coupled to the main circuit board MCB of the display module DD. The main circuit board MCB may apply signals synchronized with the display module DD to the second circuit board FCB2. A driving circuit used to drive the first electrode TE1 and the second electrode TE2 may be mounted on the second circuit board FCB2.

FIG. 8B shows the pixel PX coupled to one scan line GL, one data line DL, and the power line PL as a representative example. A configuration of the pixel PX may be changed without being limited thereto or thereby.

The organic light emitting diode OLED may be a front surface light emitting type (or kind of) diode or a rear surface light emitting type (or kind of) diode. The pixel PX includes a first transistor T1 (or a "switching transistor"), a second transistor T2 (or a "driving transistor"), and a capacitor Cst as the pixel driving circuit PDC to drive the organic light emitting diode OLED. A first power voltage ELVDD is applied to the second transistor T2, and a second power voltage ELVSS is applied to the organic light emitting diode OLED. The second power voltage ELVSS may be lower than the first power voltage ELVDD.

The first transistor T1 outputs a data signal applied thereto through the data line DL in response to a scan signal applied thereto through the scan line GL. The capacitor Cst is charged with a voltage corresponding to the data signal provided from the first transistor T1.

The second transistor T2 is coupled to the organic light emitting diode OLED. The second transistor T2 controls a driving current flowing through the organic light emitting diode OLED in response to an amount of electric charge charged in the capacitor Cst. The organic light emitting diode OLED emits a light during a turned-on period of the second transistor T2.

FIG. 8B shows a structure in which the pixel driving circuit PDC includes two transistors (e.g., the first transistor T1 and the second transistor T2) and one capacitor Cst, however, the configuration of the pixel driving circuit PDC should not be limited thereto or thereby.

As shown in FIG. 8C, in the display panel DP according to an exemplary embodiment of the present disclosure, the circuit element layer DP-CL, a display element layer DP-OLED, and a thin film encapsulation layer TFE are sequentially stacked on a base layer SUB.

The circuit element layer DP-CL includes at least one inorganic layer, at least one organic layer, and a circuit element. The circuit element layer DP-CL includes a buffer layer BFL that is the inorganic layer, a first intermediate inorganic layer 10, a second intermediate inorganic layer 20, and an intermediate organic layer 30 that is the organic layer.

The inorganic layers may include silicon nitride, silicon oxynitride, and silicon oxide. The organic layer may be at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin. The circuit element includes conductive patterns and/or semiconductor patterns.

The buffer layer BFL improves a coupling force between the base layer SUB and the conductive patterns or the semiconductor patterns. In some embodiments, a barrier layer may be further on the upper surface of the base layer SUB to prevent or reduce the entrance of foreign substances. The buffer layer BFL and the barrier layer may be selectively included or omitted.

A semiconductor pattern OSP1 (hereinafter, referred to as a "first semiconductor pattern") of the first transistor T1 and a semiconductor pattern OSP2 (hereinafter, referred to as a "second semiconductor pattern") of the second transistor T2 are on the buffer layer BFL. The first semiconductor pattern OSP1 and the second semiconductor pattern OSP2 may be selected from amorphous silicon, polysilicon, and metal oxide semiconductor.

The first intermediate inorganic layer 10 is on the first semiconductor pattern OSP1 and the second semiconductor pattern OSP2. A control electrode GE1 (hereinafter, referred to as a "first control electrode") of the first transistor T1 and a control electrode GE2 (hereinafter, referred to as a "second control electrode") of the second transistor T2 are on the first intermediate inorganic layer 10. The first control electrode GE1 and the second control electrode GE2 may be formed through the same photolithography process as the scan lines GL (refer to FIG. 8B).

The second intermediate inorganic layer 20 is on the first intermediate inorganic layer 10 to cover the first control electrode GE1 and the second control electrode GE2. An input electrode DE1 (hereinafter, referred to as a "first input electrode") and an output electrode SE1 (hereinafter, referred to as a "first output electrode") of the first transistor T1 and an input electrode DE2 (hereinafter, referred to as a "second input electrode") and an output electrode SE2 (hereinafter, referred to as a "second output electrode") of the second transistor T2 are on the second intermediate inorganic layer 20.

The first input electrode DE1 and the first output electrode SE1 are coupled to the first semiconductor pattern OSP1 respectively through a first contact hole CH1 and a second contact hole CH2, which are defined through the first intermediate inorganic layer 10 and the second intermediate inorganic layer 20. The second input electrode DE2 and the second output electrode SE2 are coupled to the second semiconductor pattern OSP2 respectively through a third contact hole CH3 and a fourth contact hole CH4, which are defined through the first intermediate inorganic layer 10 and the second intermediate inorganic layer 20. Meanwhile, according to another embodiment of the present disclosure, a portion of the first transistor T1 and the second transistor T2 may be changed to a bottom gate structure.

The intermediate organic layer 30 is on the second intermediate inorganic layer 20 to cover the first input electrode DE1, the second input electrode DE2, the first output electrode SE1, and the second output electrode SE2. The intermediate organic layer 30 may provide a flat surface.

The display element layer DP-OLED is on the intermediate organic layer 30. The display element layer DP-OLED includes a pixel definition layer PDL and an organic light emitting diode OLED. The pixel definition layer PDL includes an organic material as the intermediate organic layer 30. A first electrode AE is on the intermediate organic layer 30. The first electrode AE is coupled to the second output electrode SE2 through a fifth contact hole CH5 defined through the intermediate organic layer 30. An opening OP is defined through the pixel definition layer PDL. At least a portion of the first electrode AE is exposed through the opening OP of the pixel definition layer PDL.

The pixel PX is in a pixel area when viewed in a plan view. The pixel area includes a light emitting area PXA and a non-light emitting area NPXA located adjacent to the light emitting area PXA. The non-light emitting area NPXA surrounds the light emitting area PXA. In the present exemplary embodiment, the light emitting area PXA is defined to correspond to a portion of the first electrode AE exposed through the opening OP.

A hole control layer HCL may be commonly located in the light emitting area PXA and the non-light emitting area NPXA. In some embodiments, a common layer like the hole control layer HCL may be commonly formed over the plural pixels PX (refer to FIG. 8B).

A light emitting layer EML may be on the hole control layer HCL. The light emitting layer EML may be in an area corresponding to the opening OP. For example, the light emitting layer EML may be formed in each of the pixels PX after being divided into plural portions. The light emitting layer EML may include an organic material and/or an inorganic material. In the present exemplary embodiment, the light emitting layer EML is patterned, however, the light emitting layer EML may be commonly located over the pixels PX. In this case, the light emitting layer EML may emit a white light. In addition, the light emitting layer EML may have a multi-layer structure.

An electron control layer ECL is on the light emitting layer EML. In some embodiments, the electron control layer ECL may be commonly formed over the pixels PX (refer to FIG. 8B).

A second electrode CE is on the electron control layer ECL. The second electrode CE is commonly located over the pixels PX.

The thin film encapsulation layer TFE is on the second electrode CE. The thin film encapsulation layer TFE is commonly located over the pixels PX. In the present exemplary embodiment, the thin film encapsulation layer TFE directly covers the second electrode CE. In an exemplary embodiment of the present disclosure, a capping layer may be further between the thin film encapsulation layer TFE and the second electrode CE to cover the second electrode CE. In this case, the thin film encapsulation layer TFE may directly cover the capping layer.

FIG. 8C shows an example of the display panel, and the display panel DP should not be limited to the structure of FIG. 8C.

Figure 9:
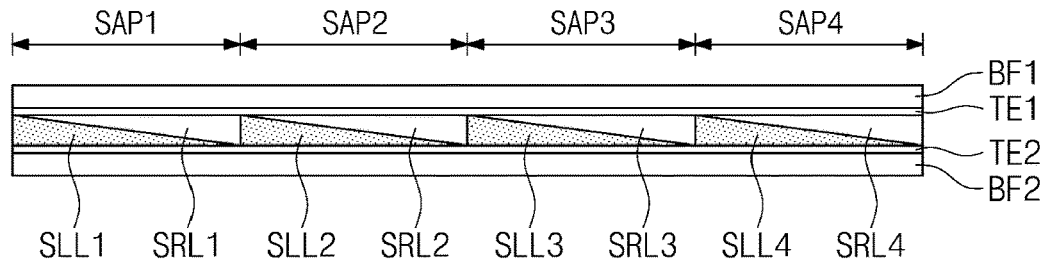
FIG. 9 is a cross-sectional view showing a dynamic prism module according to another exemplary embodiment of the present disclosure.

FIG. 9 is a cross-sectional view showing a dynamic prism module according to another exemplary embodiment of the present disclosure.

Referring to FIG. 9, the dynamic prism module according to another exemplary embodiment of the present disclosure may include a plurality of dynamic prism areas (e.g., a first dynamic prism area SAP1, a second dynamic prism area SAP2, a third dynamic prism area SAP3, and a fourth dynamic prism area SAP4). FIG. 9 shows a structure in which the dynamic prism module is divided into four dynamic prism areas (e.g., the first dynamic prism area SAP1, the second dynamic prism area SAP2, the third dynamic prism area SAP3, and the fourth dynamic prism area SAP4), however, the number of the dynamic prism areas (e.g., the first dynamic prism area SAP1, the second dynamic prism area SAP2, the third dynamic prism area SAP3, and the fourth dynamic prism area SAP4) should not be limited to four.

A resin layer according to another exemplary embodiment of the present disclosure may include a plurality of sub-resin layers (e.g., a first sub-resin layer SRL1, a second sub-resin layer SRL2, a third sub-resin layer SRL3, and a fourth sub-resin layer SRL4). The sub-resin layers (e.g., the first sub-resin layer SRL1, the second sub-resin layer SRL2, the third sub-resin layer SRL3, and the fourth sub-resin layer SRL4) may be located to correspond to the first dynamic prism area SAP1, the second dynamic prism area SAP2, the third dynamic prism area SAP3, and the fourth dynamic prism area SAP4, respectively.

Each of the sub-resin layers (e.g., the first sub-resin layer SRL1, the second sub-resin layer SRL2, the third sub-resin layer SRL3, and the fourth sub-resin layer SRL4) may include an acrylic-based polymer material. Each of the sub-resin layers (e.g., the first sub-resin layer SRL1, the second sub-resin layer SRL2, the third sub-resin layer SRL3, and the fourth sub-resin layer SRL4) may include polymethylmethacrylate (PMMA) or polycarbonate (PC).

The sub-resin layers (e.g., the first sub-resin layer SRL1, the second sub-resin layer SRL2, the third sub-resin layer SRL3, and the fourth sub-resin layer SRL4) may have the same (e.g., substantially the same) refractive index as each other. Each of the sub-resin layers (e.g., the first sub-resin layer SRL1, the second sub-resin layer SRL2, the third sub-resin layer SRL3, and the fourth sub-resin layer SRL4) may have a reference refractive index. For example, the reference refractive index may be about 1.49.

The sub-resin layers (e.g., the first sub-resin layer SRL1, the second sub-resin layer SRL2, the third sub-resin layer SRL3, and the fourth sub-resin layer SRL4) may be on a first electrode TE1. Each of the sub-resin layers (e.g., the first sub-resin layer SRL1, the second sub-resin layer SRL2, the third sub-resin layer SRL3, and the fourth sub-resin layer SRL4) may include an inclination surface inclined at a first angle with respect to the first electrode TE1.

A refractive index control layer includes a plurality of sub-control layer (e.g., a first sub-control layer SLL1, a second sub-control layer SLL2, a third sub-control layer SLL3, and a fourth sub-control layer SLL4) located to correspond to the sub-resin layers (e.g., the first sub-resin layer SRL1, the second sub-resin layer SRL2, the third sub-resin layer SRL3, and the fourth sub-resin layer SRL4), respectively.

Each of the sub-control layers (e.g., the first sub-control layer SLL1, the second sub-control layer SLL2, the third sub-control layer SLL3, and the fourth sub-control layer SLL4) may include a material having a refractive index anisotropy. As an example of the present disclosure, each of the sub-control layers (e.g., the first sub-control layer SLL1, the second sub-control layer SLL2, the third sub-control layer SLL3, and the fourth sub-control layer SLL4) may be a liquid crystal layer including liquid crystal molecules LCM.

Each of the sub-control layers (e.g., the first sub-control layer SLL1, the second sub-control layer SLL2, the third sub-control layer SLL3, and the fourth sub-control layer SLL4) may be between a corresponding sub-resin layer among the sub-resin layers (e.g., the first sub-resin layer SRL1, the second sub-resin layer SRL2, the third sub-resin layer SRL3, and the fourth sub-resin layer SRL4) and a second electrode TE2. A first base film BF1 on which the first electrode TE1 and the sub-resin layers (e.g., the first sub-resin layer SRL1, the second sub-resin layer SRL2, the third sub-resin layer SRL3, and the fourth sub-resin layer SRL4) are formed and a second base film BF2 on which the second electrode TE2 is formed may be coupled to each other such that the first electrode TE1 and the second electrode TE2 face each other. The sub-control layers (e.g., the first sub-control layer SLL1, the second sub-control layer SLL2, the third sub-control layer SLL3, and the fourth sub-control layer SLL4) may be formed by injecting a liquid crystal material into between the first base film BF1 and the second base film BF2.

Each of the sub-control layers (e.g., the first sub-control layer SLL1, the second sub-control layer SLL2, the third sub-control layer SLL3, and the fourth sub-control layer SLL4) is located to make contact (e.g., physical contact) with the inclination surface of the corresponding sub-resin layer among the sub-resin layers (e.g., selected from the first sub-resin layer SRL1, the second sub-resin layer SRL2, the third sub-resin layer SRL3, and the fourth sub-resin layer SRL4). Accordingly, an interface between each of the sub-control layers (e.g., the first sub-control layer SLL1, the second sub-control layer SLL2, the third sub-control layer SLL3, and the fourth sub-control layer SLL4) and the corresponding sub-resin layer among the sub-resin layers (e.g., selected from the first sub-resin layer SRL1, the second sub-resin layer SRL2, the third sub-resin layer SRL3, and the fourth sub-resin layer SRL4) may be inclined at a first angle with respect to the first electrode TE1.

The first angle may have a constant value for each of the first dynamic prism area SAP1, the second dynamic prism area SAP2, the third dynamic prism area SAP3, and the fourth dynamic prism area SAP4, however, it should not be limited thereto or thereby. The first angle may have a different value for each of the first dynamic prism area SAP1, the second dynamic prism area SAP2, the third dynamic prism area SAP3, and the fourth dynamic prism area SAP4.

Figure 10:
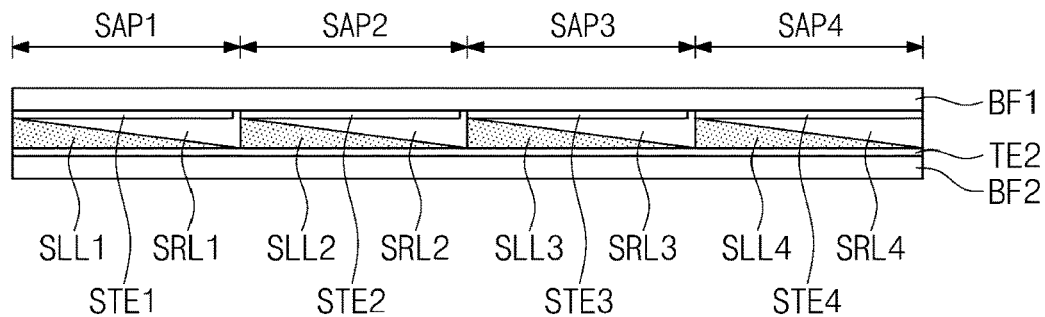
FIG. 10 is a cross-sectional view showing a dynamic prism module according to another exemplary embodiment of the present disclosure.

FIG. 10 is a cross-sectional view showing a dynamic prism module according to another exemplary embodiment of the present disclosure.

Referring to FIG. 10, in the a dynamic prism module according to another exemplary embodiment of the present disclosure, a first electrode may include a plurality of sub-electrodes (e.g., a first sub-electrode STE1, a second sub-electrode STE2, a third sub-electrode STE3, and a fourth sub-electrode STE4) located to respectively correspond to the first dynamic prism area SAP1, the second dynamic prism area SAP2, the third dynamic prism area SAP3, and the fourth dynamic prism area SAP4). A plurality of sub-resin layers (e.g., a first sub-resin layer SRL1, a second sub-resin layer SRL2, a third sub-resin layer SRL3, and a fourth sub-resin layer SRL4) may be on the sub-electrodes located to respectively correspond to the sub-electrodes (e.g., the first sub-electrode STE1, the second sub-electrode STE2, the third sub-electrode STE3, and the fourth sub-electrode STE4).

The sub-electrodes (e.g., the first sub-electrode STE1, the second sub-electrode STE2, the third sub-electrode STE3, and the fourth sub-electrode STE4) may receive the same driving voltage. During a turned-off period of the dynamic prism module, the sub-electrodes (e.g., the first sub-electrode STE1, the second sub-electrode STE2, the third sub-electrode STE3, and the fourth sub-electrode STE4) may receive the driving voltage. The driving voltage may be substantially the same as a reference voltage applied to a second electrode TE2.

The sub-electrodes (e.g., the first sub-electrode STE1, the second sub-electrode STE2, the third sub-electrode STE3, and the fourth sub-electrode STE4) may receive different driving voltages from each other. During a turned-on period of the dynamic prism module, the sub-electrodes (e.g., the first sub-electrode STE1, the second sub-electrode STE2, the third sub-electrode STE3, and the fourth sub-electrode STE4) may receive respective driving voltages. The respective driving voltages may have different voltage levels and may have a voltage level different from the reference voltage applied to the second electrode TE2.

As described above, when the sub-electrodes (e.g., the first sub-electrode STE1, the second sub-electrode STE2, the third sub-electrode STE3, and the fourth sub-electrode STE4) receive the respective driving voltages, the first dynamic prism area SAP1, the second dynamic prism area SAP2, the third dynamic prism area SAP3, and the fourth dynamic prism area SAP4 may have different refractive indices in the turned-on state. When the levels of the respective driving voltages are different from each other, an intensity of the electric field formed in each of the first dynamic prism area SAP1, the second dynamic prism area SAP2, the third dynamic prism area SAP3, and the fourth dynamic prism area SAP4 is changed. When the intensity of the electric field becomes different, the alignment of the liquid crystal molecules is changed. Accordingly, the refractive indices of the respective dynamic prism areas (e.g., the first dynamic prism area SAP1, the second dynamic prism area SAP2, the third dynamic prism area SAP3, and the fourth dynamic prism area SAP4) may be different from each other. For example, the refractive index may be controlled for each of the first dynamic prism area SAP1, the second dynamic prism area SAP2, the third dynamic prism area SAP3, and the fourth dynamic prism area SAP4 by dividing the first electrode into the sub-electrodes (e.g., the first sub-electrode STE1, the second sub-electrode STE2, the third sub-electrode STE3, and the fourth sub-electrode STE4).

Figure 11:
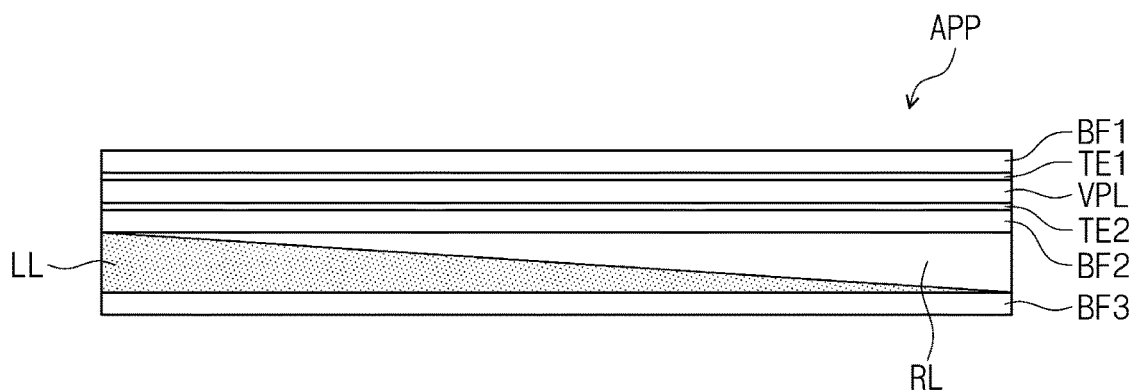
FIG. 11 is a cross-sectional view showing a dynamic prism module according to another exemplary embodiment of the present disclosure.
Figure 12A:
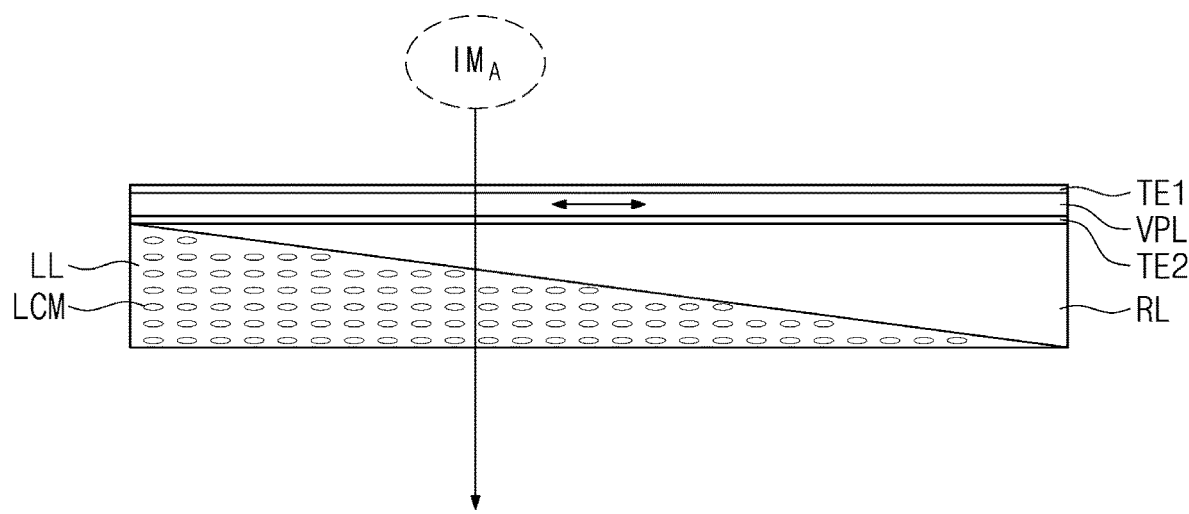
FIG. 12A is a view showing a turned-off state of the dynamic prism module shown in FIG. 11.
Figure 12B:
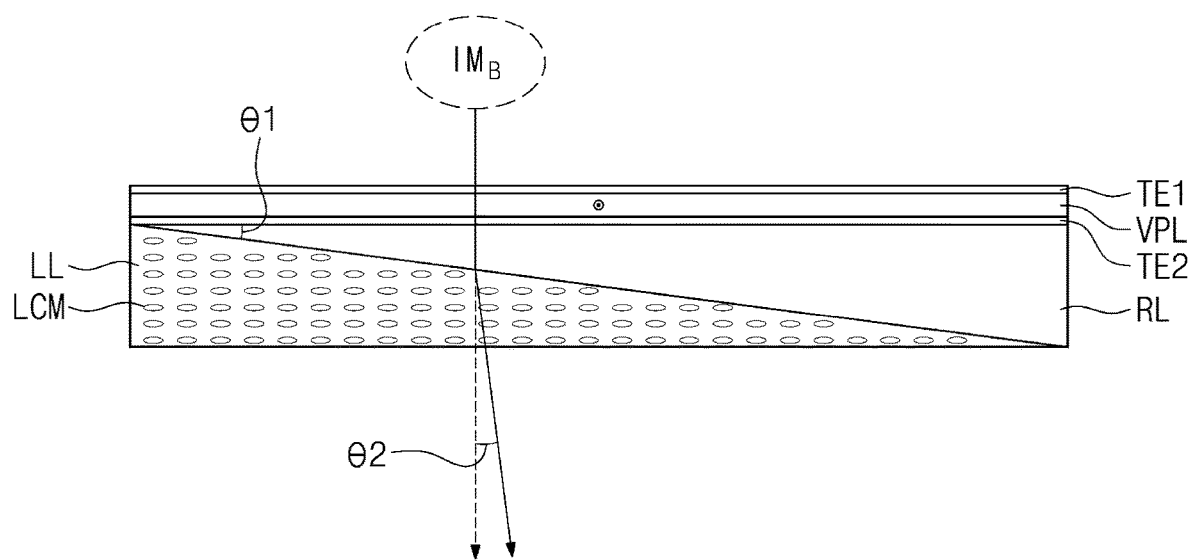
FIG. 12B is a view showing a turned-on state of the dynamic prism module shown in FIG. 11.

FIG. 11 is a cross-sectional view showing a dynamic prism module according to another exemplary embodiment of the present disclosure, FIG. 12A is a view showing a turned-off state of the dynamic prism module shown in FIG. 11, and FIG. 12B is a view showing a turned-on state of the dynamic prism module shown in FIG. 11.

Referring to FIGS. 11 to 12B, the dynamic prism module APP according to another exemplary embodiment of the present disclosure includes a first electrode TE1, a second electrode TE2, a variable polarizer layer VPL, a resin layer RL, and a refractive index control layer LL.

The first electrode TE1 and the second electrode TE2 are located to face each other, and the variable polarization layer VPL is between the first electrode TE1 and the second electrode TE2. A polarizing property of the variable polarization layer VPL may be dynamically varied by an electric field formed between the first electrode TE1 and the second electrode TE2.

The dynamic prism module APP further includes a first base film BF1, a second base film BF2, and a third base film BF3.

The first electrode TE1 is on one surface of the first base film BF1, and the second electrode TE2 is on one surface of the second base film BF2. The first base film BF1 and the second base film BF2 are located to allow the first electrode TE1 and the second electrode TE2 to face each other.

Voltages may be applied to the first electrode TE1 and the second electrode TE2, respectively. When the same voltage is applied to the first electrode TE1 and the second electrode TE2, no electric field is formed between the first electrode TE1 and the second electrode TE2, and the dynamic prism module APP is in a turned-off state. On the contrary, when different voltages are respectively applied to the first electrode TE1 and the second electrode TE2, the electric field is formed between the first electrode TE1 and the second electrode TE2. The state in which the electric field is formed may be defined as a turned-on state of the dynamic prism module APP.

The variable polarizer layer VPL may include a polarizing material that varies a polarizing property of a light incident thereto in response to the electric field formed between the first electrode TE1 and the second electrode TE2. As an example of the present disclosure, the polarizing material may be a liquid crystal material. In the turned-off state in which the electric field is not formed between the first electrode TE1 and the second electrode TE2, the variable polarizer layer VPL may polarize the light incident thereto to a first polarizing state. In the turned-on state in which the electric field is formed between the first electrode TE1 and the second electrode TE2, the variable polarizer layer VPL may polarize the light incident thereto to a second polarizing state.

The display module DD may periodically provide different images. In more detail, the display module DD may display first image $IM_A$ and the second image $IM_B$ during one frame. According to another embodiment, the dynamic prism module APP may be turned on or off in synchronization with the display module DD (refer to FIG. 1). In more detail, the dynamic prism module APP may receive the first image $IM_A$ from the display module DD during the turned-off period and may receive the second image $IM_B$ from the display module DD during the turned-on period.

Accordingly, the light incident into the variable polarizer layer VPL during the turned-off period may include the first image $IM_A$, and the light incident into the variable polarizer layer VPL during the turned-on period may include the second image $IM_B$.

The resin layer RL and the refractive index control layer LL may be between the second base film BF2 and the third base film BF3. The resin layer RL may include an acrylic-based polymer layer. As an example, the resin layer RL may include polymethylmethacrylate (PMMA) or polycarbonate (PC). The resin layer RL may have a reference refractive index. The resin layer RL may include a surface (hereinafter, referred to as a "first inclination surface") inclined with respect to an upper surface of the first electrode TE1. The first inclination surface may be inclined at a first angle θ1 with respect to a lower surface of the second base film BF2.

The refractive index control layer LL may be on the resin layer RL. The refractive index control layer LL may include a material having a refractive index anisotropy. As an example of the present disclosure, the refractive index control layer LL may be a liquid crystal layer including liquid crystal molecules LCM. The refractive index control layer LL may be between the resin layer RL and the third base film BF3.

The refractive index control layer LL is located to make contact (e.g., physical contact) with the first inclination surface of the resin layer RL. An interface between the refractive index control layer LL and the resin layer RL is inclined at the first angle θ1 with respect to the lower surface of the second base film BF2. The refractive index control layer LL may have substantially the same refractive index as the resin layer RL.

As shown in FIG. 12A, when the dynamic prism module APP is in the turned-off state, the variable polarizer layer VPL may polarize the light incident thereto to the first polarizing state. As an example of the present disclosure, the first polarizing state may be one of a circularly-polarized state or linearly-polarized state. The light polarized to the first polarizing state is incident into the refractive index control layer LL. The light polarized to the first polarizing state experiences that the refractive index control layer LL and the resin layer RL have substantially the same refractive index as each other. Thus, the light polarized to the first polarizing state may travel without being refracted while passing through the interface between the refractive index control layer LL and the resin layer RL.

As shown in FIG. 12B, when the dynamic prism module APP is in the turned-on state, the variable polarizer layer VPL may polarize the light incident thereto to the second polarizing state. As an example of the present disclosure, the second polarizing state may be one of a circularly-polarized state or linearly-polarized state. The light polarized to the second polarizing state is incident into the refractive index control layer LL. The light polarized to the second polarizing state experiences the difference in refractive indices between the refractive index control layer LL and the resin layer RL. Thus, the light polarized to the second polarizing state is refracted at a second angle θ2 while passing through the interface between the refractive index control layer LL and the resin layer RL.

The second angle θ2 may be determined based on the difference in refractive index between the refractive index control layer LL and the resin layer RL experienced by the light polarized to the second polarizing state and the first angle θ1.

Figure 13:
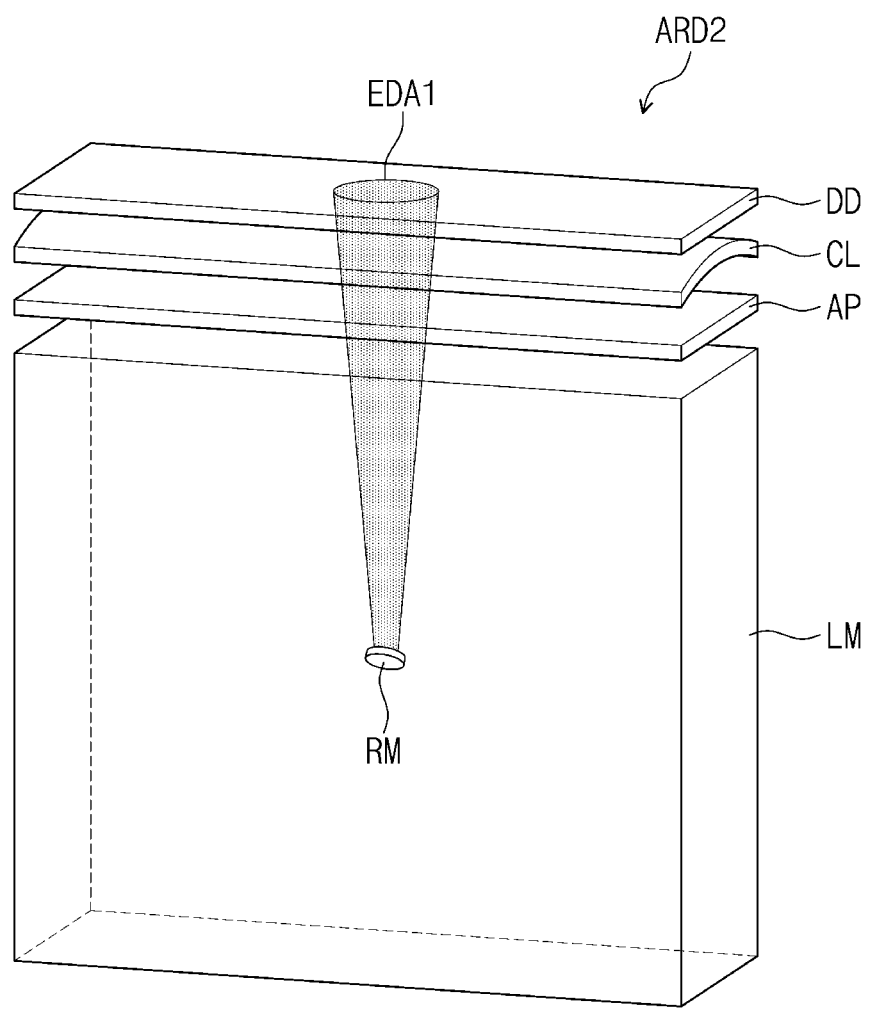
FIG. 13 is a perspective view showing an augmented reality providing device according to another exemplary embodiment of the present disclosure.
Figure 14:
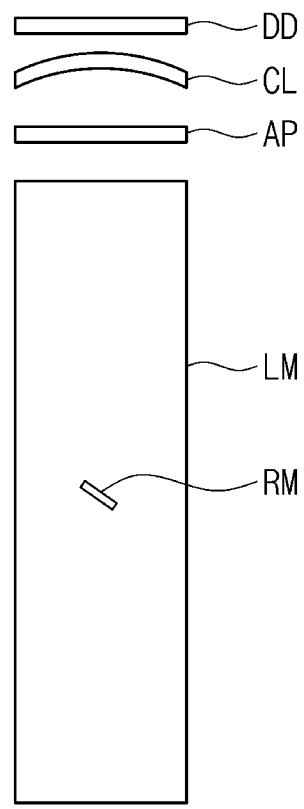
FIG. 14 is a cross-sectional view showing the augmented reality providing device shown in FIG. 13.

FIG. 13 is a perspective view showing an augmented reality providing device ARD2 according to another exemplary embodiment of the present disclosure, and FIG. 14 is a cross-sectional view showing the augmented reality providing device ARD2 shown in FIG. 13.

Referring to FIGS. 13 and 14, the augmented reality providing device ARD2 according to another exemplary embodiment of the present disclosure may further include a light collecting member CL.

The light collecting member CL may receive an image from a display module DD and may collect the received image. The light collecting member CL may be between the display module DD and a dynamic prism module AP. The light collecting member CL may include a convex lens convex toward the display module DD.

The display module DD may include a display area EDA1 through which the image is displayed. The image displayed through the display area EDA1 may be collected by the light collecting member CL and may be provided to a lens LM. The dynamic prism module AP may be between the light collecting member CL and the lens LM. Because the dynamic prism module AP has the structure shown in FIGS. 1 to 12B and operates on an operation principle corresponding to the structure, and thus, duplicative description thereof will not be repeated here.

The image displayed through the display area EDA1 may be provided to a reflective mirror RM after being collected by the light collecting member CL. A size of the display area EDA1 providing the image to the reflective mirror RM may vary depending on the presence or absence of the light collecting member CL.

As shown in FIGS. 1 and 13, when assuming that the display area IDA of the display module DD has a first size in a case where there is no light collecting member CL, the display area EDA1 of the display module DD has a size larger than the first size when there is the light collecting member CL. For example, when the light collecting member CL is provided, the size of the display area EDA1 providing the image to the reflective mirror RM may increase. Because the image is provided to the reflective mirror RM from the relatively larger display area EDA1 in the display module DD, the field of view (FOV) may be enlarged.

FIGS. 13 and 14 show the structure in which the light collecting member CL is between the display module DD and the dynamic prism module AP, however, it should not be limited thereto or thereby. As another example of the present disclosure, the light collecting member CL may be between the dynamic prism module AP and the lens LM.

Figure 15:
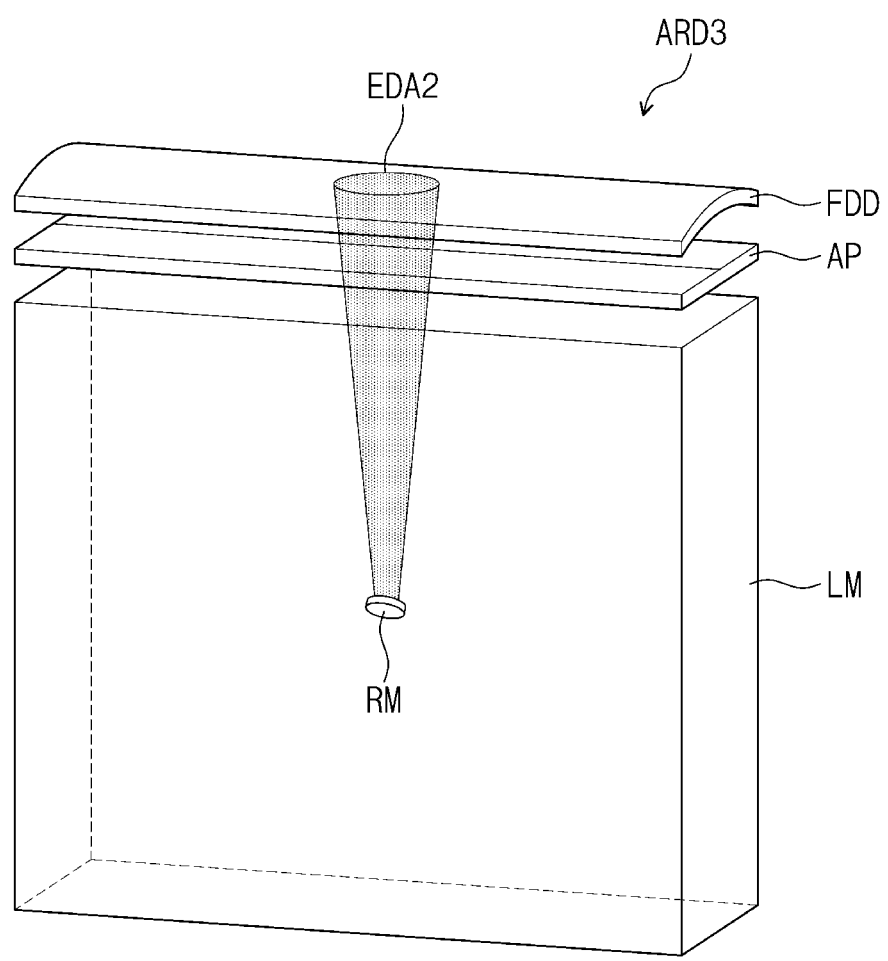
FIG. 15 is a perspective view showing an augmented reality providing device according to another exemplary embodiment of the present disclosure.
Figure 16:
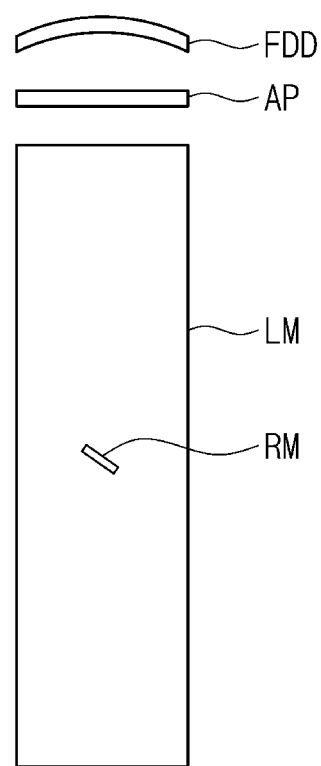
FIG. 16 is a cross-sectional view showing the augmented reality providing device shown in FIG. 15.

FIG. 15 is a perspective view showing an augmented reality providing device ARD3 according to another exemplary embodiment of the present disclosure, and FIG. 16 is a cross-sectional view showing the augmented reality providing device ARD3 shown in FIG. 15.

Referring to FIGS. 15 and 16, the augmented reality providing device ARD3 according to another exemplary embodiment of the present disclosure may include a flexible display module FDD. The flexible display module FDD may be an organic light emitting display device.

The flexible display module FDD may have a structure curved in one direction. In more detail, the flexible display module FDD may have the structure in which a display surface on which the image is displayed is concavely curved. The display surface may be a surface facing one side surface of a lens LM.

A dynamic prism module AP is between the flexible display module FDD and the lens LM. The dynamic prism module AP has the structure shown in FIGS. 1 to 12B and operates on an operation principle corresponding to the structure, and thus, duplicative description thereof will not be repeated here.

The image output from the flexible display module FDD may be provided to a reflective mirror RM after passing through the dynamic prism module AP. The flexible display module FDD may have a refractive index that varies depending on a distance between the reflective mirror RM and the flexible display module FDD.

In the case where the flexible display module FDD is curved, a size of a display area EDA2 providing the image to the reflective mirror RM may increase. For example, as shown in FIGS. 1 and 15, when assuming that the display area IDA of the display module DD has a first size in a case where the display module DD is flat, the display area EDA2 of the display module FDD has a size larger than the first size when the flexible display module FDD is curved. Accordingly, because the image is provided to the reflective mirror RM from the relatively wider display area EDA2 when the curved flexible display module FDD is used, the field of view (FOV) may be enlarged.

FIGS. 15 and 16 show the structure in which only the flexible display module FDD is curved, however, the dynamic prism module AP may be curved along the flexible display module FDD. As another example of the present disclosure, the lens LM may have a shape whose side surface facing the flexible display module FDD is curved along the flexible display module FDD.

Figure 17:
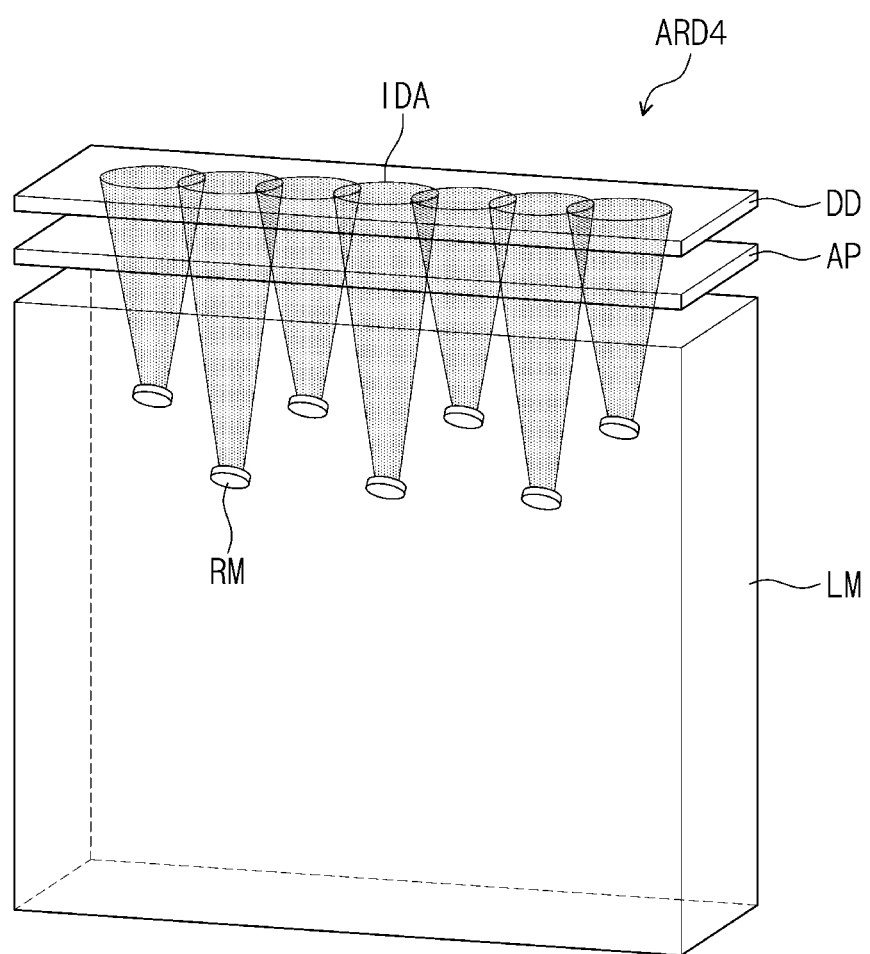
FIG. 17 is a perspective view showing an augmented reality providing device according to another exemplary embodiment of the present disclosure.

FIG. 17 is a perspective view showing an augmented reality providing device ARD4 according to another exemplary embodiment of the present disclosure.

Referring to FIG. 17, a lens LM may include a plurality of reflective mirrors RM in the augmented reality providing device ARD4 according to another exemplary embodiment of the present disclosure. The reflective mirrors RM may reflect images provided from a plurality of display areas IDA of a display module DD, respectively.

FIG. 17 shows a structure in which the display areas IDA partially overlap with each other as a representative example, however, they should not be limited thereto or thereby. For example, the display areas IDA may not overlap with each other.

The reflective mirrors RM may be arranged in a longitudinal direction of the display module DD, and in this case, the field of view (FOV) may be enlarged in the longitudinal direction of the display module DD.

In some embodiments, the reflective mirrors RM may be arranged in a width direction of the display module DD. In this case, the field of view (FOV) may be enlarged in the width direction of the display module DD.

However, in the case where the dynamic prism module AP and the dynamic prism module APP shown in FIGS. 1 to 12B are used, the augmented reality providing device ARD1 has an effect of increasing the field of view (FOV) in the width direction of the display module DD. Accordingly, when the dynamic prism module AP and the dynamic prism module APP according to the present disclosure are used, the field of view (FOV) may be enlarged without increasing the size of the display module DD in the width direction or the thickness of the lens LM in the width direction of the display module DD.

Figure 18:
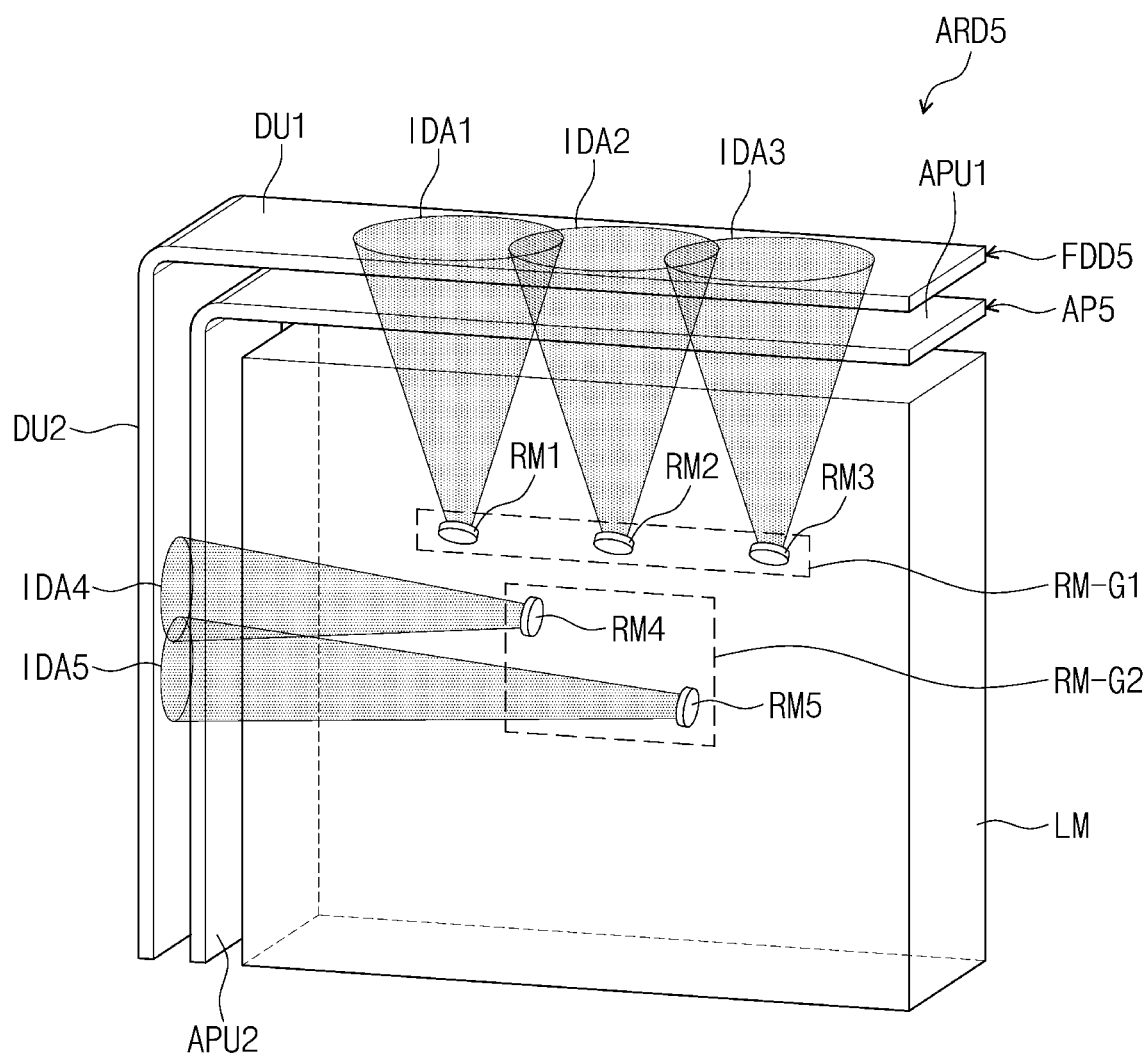
FIG. 18 is a perspective view showing an augmented reality providing device according to another exemplary embodiment of the present disclosure.

FIG. 18 is a perspective view showing an augmented reality providing device ARD5 according to another exemplary embodiment of the present disclosure.

Referring to FIG. 18, a flexible display module FDD5 may be arranged along at least two side surfaces of a lens LM in the augmented reality providing device ARD5 according to another exemplary embodiment of the present disclosure. The flexible display module FDD5 may have a shape folded in a portion at which the two side surfaces make contact (e.g., physical contact) with each other.

The flexible display module FDD5 may include a first display unit DU1 corresponding to a first side surface of the lens LM and a second display unit DU2 corresponding to a second side surface of the lens LM.

The lens LM may include a first reflective mirror group RM-G1 that reflects an image displayed through the first display unit DU1 and a second reflective mirror group RM-G2 that reflects an image displayed through the second display unit DU2. The first reflective mirror group RM-G1 may include a first reflective mirror RM1, a second reflective mirror RM2, and a third reflective mirror RM3 that respectively reflect images displayed through a first display area IDA1, a second display area IDA2, and a third display area IDA3 of the first display unit DU1. The second reflective mirror group RM-G2 may include a fourth reflective mirror RM4 and a fifth reflective mirror RM5 that respectively reflect images displayed through a fourth display area IDA4 and a fifth display area IDA5 of the second display unit DU2.

The augmented reality providing device ARD5 shown in FIG. 18 may include a dynamic prism module AP5 having a shape curved along the flexible display module FDD5. The dynamic prism module AP5 may include a first dynamic prism unit APU1 and a second dynamic prism unit APU2. The first dynamic prism unit APU1 may be between the first side surface of the lens LM and the first display unit DU1, and the second dynamic prism unit APU2 may be between the second side surface of the lens LM and the second display unit DU2.

The first display unit DU1 and the second display unit DU2 may be concurrently (e.g., simultaneously or substantially simultaneously) operated by one driving circuit or may be independently operated by respectively having separate driving circuits. In the case where the first display unit DU1 and the second display unit DU2 are independently operated, each of the first dynamic prism unit APU1 and the second dynamic prism unit APU2 may operate in synchronization with a corresponding display unit.

The structure and operation principle of each of the first dynamic prism unit APU1 and the second dynamic prism unit APU2 are substantially the same as those of the dynamic prism module AP and the dynamic prism module APP shown in FIGS. 1 to 12B, and thus, duplicative description thereof will not be repeated here.

In the case where the first dynamic prism unit APU1 and the second dynamic prism unit APU2 are included, the augmented reality providing device ARD5 may have an effect of enlarging the field of view (FOV) even though the reflective mirrors are not further arranged in a width direction of the flexible display module FDD5. Accordingly, the field of view (FOV) may be enlarged without increasing the size of the flexible display module FDD in the width direction or the thickness of the lens LM in the width direction of the flexible display module FDD.

Figure 19:
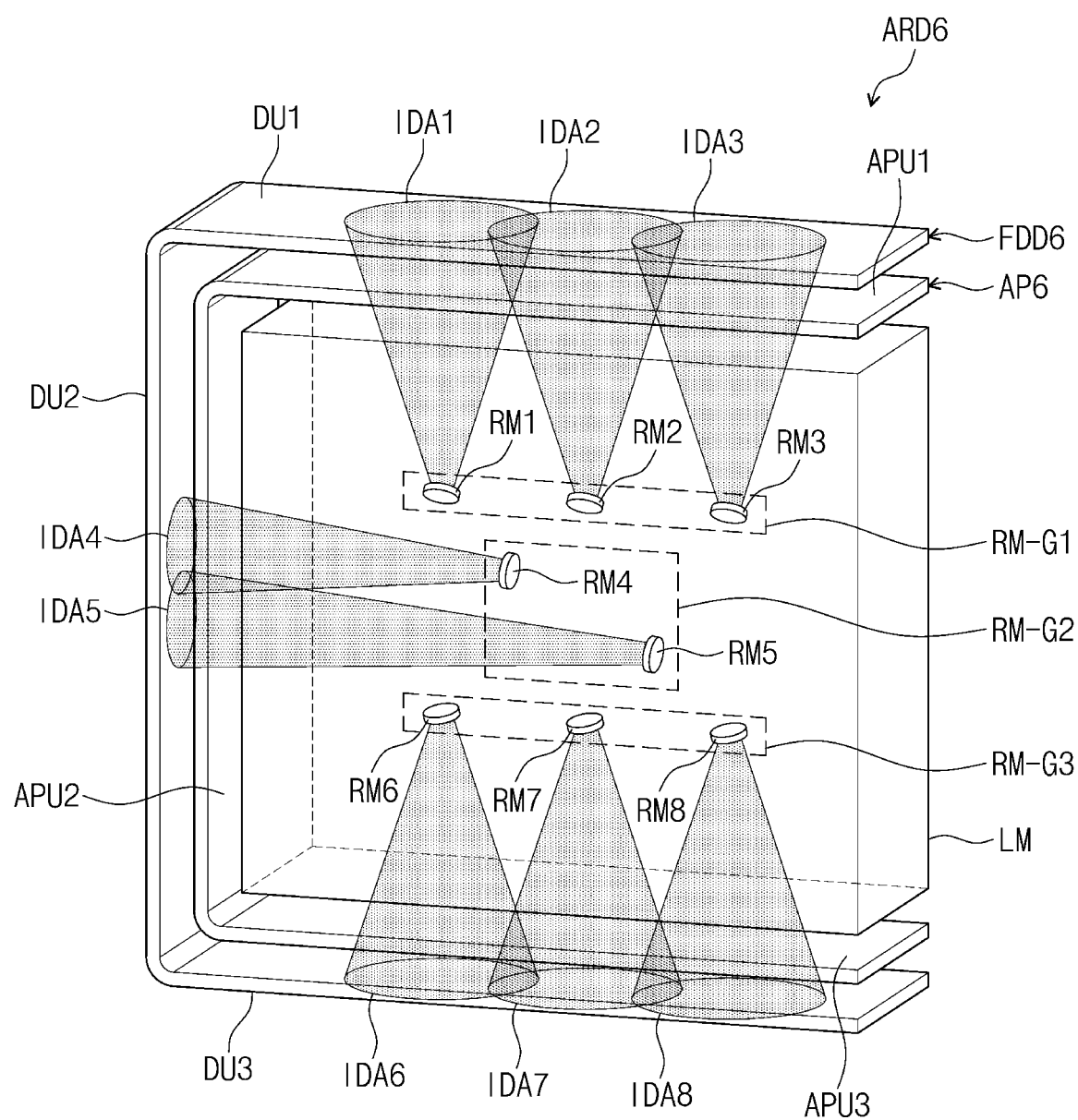
FIG. 19 is a perspective view showing an augmented reality providing device according to another exemplary embodiment of the present disclosure.

FIG. 19 is a perspective view showing an augmented reality providing device ARD6 according to another exemplary embodiment of the present disclosure.

Referring to FIG. 19, a flexible display module FDD6 may be arranged along at least three side surfaces of a lens LM in the augmented reality providing device ARD6 according to another exemplary embodiment of the present disclosure. FIG. 19 shows the structure in which the flexible display module FDD6 is located along the three side surfaces of the lens LM. In this case, the flexible display module FDD6 may have a double-folded shape.

The flexible display module FDD6 includes a first display unit DU1, a second display unit DU2, and a third display unit DU3. The first display unit DU1, the second display unit DU2, and the third display unit DU3 respectively correspond to a first side surface, a second side surface, and a third side surface of the lens LM. The first display unit DU1 includes a first display area IDA1, a second display area IDA2, and a third display area IDA3, the second display unit DU2 includes a fourth display area IDA4 and a fifth display area IDA5, and the third display unit DU3 includes a sixth display area IDA6, a seventh display area IDA7, and an eighth display area IDA8.

The lens LM may include a first reflective mirror group RM-G1, a second reflective mirror group RM-G2, and a third reflective mirror group RM-G3. The first reflective mirror group RM-G1 reflects an image displayed through the first display unit DU1, the second reflective mirror group RM-G2 reflects an image displayed through the second display unit DU2, and the third reflective mirror group RM-G3 reflects an image displayed through the third display unit DU3.

The first reflective mirror group RM-G1 includes a first reflective mirror RM1, a second reflective mirror RM2, and a third reflective mirror RM3 to respectively reflect images of the first display area IDA1, the second display area IDA2, and the third display area IDA3. The second reflective mirror group RM-G2 includes a fourth reflective mirror RM4 and a fifth reflective mirror RM5 to respectively reflect images of the fourth display area IDA4 and the fifth display area IDA5, and the third reflective mirror group RM-G3 includes a sixth reflective mirror RM6, a seventh reflective mirror RM7, and an eighth reflective mirror RM8 to respectively reflect images of the sixth display area IDA6, the seventh display area IDA7, and the eighth display area IDA8.

The augmented reality providing device ARD6 shown in FIG. 19 may include a dynamic prism module AP6 having a shape curved along the flexible display module FDD6. The dynamic prism module AP6 may include a first dynamic prism unit APU1, a second dynamic prism unit APU2, and a third dynamic prism unit APU3. The first dynamic prism unit APU1 may be between the first side surface of the lens LM and the first display unit DU1, and the second dynamic prism unit APU2 may be between the second side surface of the lens LM and the second display unit DU2. The third dynamic prism unit APU3 may be between the third side surface of the lens LM and the third display unit DU3.

The structure and operation principle of each of the first dynamic prism unit APU1, the second dynamic prism unit APU2, and the third dynamic prism unit APU3 are substantially the same as those of the dynamic prism module AP and the dynamic prism module APP shown in FIGS. 1 to 12B, and thus, duplicative description thereof will not be repeated here.

In the case where the first dynamic prism unit APU1, the second dynamic prism unit APU2, and the third dynamic prism unit APU3 are included, the augmented reality providing device ARD6 may have an effect of enlarging the field of view (FOV) even though the reflective mirrors are not further arranged in a width direction of the flexible display module FDD6. Accordingly, the field of view (FOV) may be enlarged without increasing the size of the flexible display module FDD6 in the width direction or the thickness of the lens LM in the width direction of the flexible display module FDD6.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use,"

"using," and "used" may be considered synonymous with the terms "utilize," "utilizing," and "utilized," respectively. Also, the term "exemplary" is intended to refer to an example or illustration.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Although exemplary embodiments of the present disclosure have been described, it is understood that the present disclosure should not be limited to these exemplary embodiments, but various changes and modifications can be made by one ordinary skilled in the art within the spirit and scope of the present disclosure as hereinafter claimed.

Therefore, the disclosed subject matter should not be limited to any single embodiment described herein, and the scope of the present disclosure shall be determined according to the attached claims, and equivalents thereof.

What is claimed is:

1. An optical device comprising:
   a lens comprising a reflective mirror;
   a display module on at least one side surface of the lens and configured to display an image; and
   a dynamic prism module between the display module and the lens and configured to receive the image, the dynamic prism module being configured to be dynamically turned on or off to provide the image to different positions of the reflective mirror,
   wherein the dynamic prism module comprises:
   a first electrode;
   a second electrode;
   a resin layer having a reference refractive index; and
   refractive index control layer being configured to be turned on or off by an electric field formed between the first electrode and the second electrode to vary a refractive index thereof,
   wherein the resin layer comprises an inclination surface contacting with the refractive index control layer.

2. The optical device of claim 1, wherein the inclination surface is inclined at a first angle with respect to the first electrode.

3. The optical device of claim 2, wherein the refractive index control layer comprises a refractive index anisotropy material.

4. The optical device of claim 3, wherein the refractive index anisotropy material is a liquid crystal material.

5. The optical device of claim 2, wherein the refractive index control layer has a first refractive index that is equal to the reference refractive index in a turned-off state and has a second refractive index that is different from the reference refractive index in a turned-on state.

6. The optical device of claim 5, wherein, when the dynamic prism module is in the turned-off state, the image is provided to a first position of the reflective mirror without being refracted by the refractive index control layer, and when the dynamic prism module is in the turned-on state, the image is provided to a second position of the reflective mirror after being refracted at a second angle by the refractive index control layer.

7. The optical device of claim 6, wherein the second angle is determined by a difference between the reference refractive index and the second refractive index and the first angle.

8. The optical device of claim 1, wherein the dynamic prism module comprises a plurality of dynamic prism areas.

9. The optical device of claim 8, wherein the resin layer comprises a plurality of sub-resin layers respectively corresponding to the dynamic prism areas, and the refractive index control layer comprises a plurality of sub-refractive index control layers respectively corresponding to the plurality of sub-resin layers.

10. The optical device of claim 9, wherein the first electrode comprises a plurality of sub-electrodes located to respectively correspond to the plurality of sub-resin layers.

11. The optical device of claim 1, wherein the dynamic prism module is configured to be turned on or off in synchronization with the display module.

12. The optical device of claim 1, further comprising a light collecting member configured to receive the image from the display module and configured to collect the image.

13. The optical device of claim 12, wherein the light collecting member is between the display module and the dynamic prism module.

14. The optical device of claim 1, wherein the display module comprises an organic light emitting display device.

15. The optical device of claim 1, wherein the display module comprises a flexible display module.

16. The optical device of claim 15, wherein the flexible display module is on two or more side surfaces of the lens.

17. The optical device of claim 15, wherein the flexible display module comprises two or more display units, and the two or more display units respectively correspond to two or more side surfaces of the lens.

18. An optical device comprising:
   a lens comprising a reflective mirror;
   a display module on at least one side surface of the lens and configured to display an image; and
   a dynamic prism module between the display module and the lens and configured to receive the image, the dynamic prism module being configured to be dynamically turned on or off to provide the image to different positions of the reflective mirror,
   wherein the dynamic prism module comprises:
   a first electrode;
   a second electrode;
   a variable polarizer layer having a polarizing state that is dynamically varied by an electric field formed between the first electrode and the second electrode;
   a resin layer between the variable polarizer layer and the lens and having a reference refractive index; and
   a refractive index control layer between the variable polarizer layer and the lens,
   wherein the resin layer comprises an inclination surface contacting with the refractive index control layer.

19. The optical device of claim 18, wherein the inclination surface is inclined at a first angle with respect to the first electrode.

* * * * *